United States Patent
Allison et al.

(10) Patent No.: US 12,249,952 B2
(45) Date of Patent: Mar. 11, 2025

(54) APPARATUSES, SYSTEMS, AND METHODS FOR WIND-RESILIENT SOLAR ARRAY FIELDS

(71) Applicant: Quest Renewables, Inc., Atlanta, GA (US)

(72) Inventors: Darby Allison, Atlanta, GA (US); Norman Painter Findley, IV, Atlanta, GA (US); James Keane, Atlanta, GA (US); Lauren Terris, Arvada, CO (US)

(73) Assignee: QUEST RENEWABLES, INC., Washington, DC (US)

( * ) Notice: Subject to any disclaimer, the term of this patent is extended or adjusted under 35 U.S.C. 154(b) by 0 days.

(21) Appl. No.: 18/335,761

(22) Filed: Jun. 15, 2023

(65) Prior Publication Data

US 2024/0128922 A1    Apr. 18, 2024

Related U.S. Application Data

(60) Provisional application No. 63/415,803, filed on Oct. 13, 2022.

(51) Int. Cl.
*H02S 20/32*       (2014.01)

(52) U.S. Cl.
CPC .................................... *H02S 20/32* (2014.12)

(58) Field of Classification Search
CPC ..................................................... H02S 20/32
See application file for complete search history.

(56) References Cited

U.S. PATENT DOCUMENTS

| | | | |
|---|---|---|---|
| 8,324,496 B1 * | 12/2012 | Gross | H02S 20/24 136/246 |
| 9,142,700 B2 | 9/2015 | Meine | |
| 9,309,910 B2 | 4/2016 | Anderson | |
| 9,379,660 B2 | 6/2016 | Al-Haddad et al. | |
| 9,882,524 B2 | 1/2018 | Al-Haddad et al. | |
| 9,893,676 B2 | 2/2018 | Anderson | |
| 9,973,139 B2 | 5/2018 | Goodman | |
| 10,601,364 B1 | 3/2020 | Au | |
| 2004/0261836 A1 | 12/2004 | Kataoka | |
| 2012/0181973 A1 * | 7/2012 | Lyden | H01L 31/02 320/101 |

(Continued)

FOREIGN PATENT DOCUMENTS

WO    2011129686 A1    10/2011

OTHER PUBLICATIONS

Designing for the Wind Using Dynamic Wind Analysis and Protective Stow Strategies to Lower Solar Tracker Lifetime Costs, White Paper: Optimizing Your Energy Yield, Sep. 1, 2018.

*Primary Examiner* — Jayne L Mershon
(74) *Attorney, Agent, or Firm* — Amy E. Allen Hinson; Parker Poe Adams & Bernstein, LLP

(57) ABSTRACT

Apparatuses, systems, and methods for providing wind-resilient solar panel array fields. The solar panel array fields may have perimeter solar panel racking structures and core solar panel racking structures. The perimeter solar panel racking structures forming at least a perimeter around the core solar panel racking structures to help shield core solar panel racking structures and reduce wind forces applied to the core solar panel racking structures. The perimeter solar panel racking structures may be rigid and may be more wind tolerant than the core solar panel racking structures.

23 Claims, 14 Drawing Sheets

(56) References Cited

U.S. PATENT DOCUMENTS

| | | | |
|---|---|---|---|
| 2014/0124018 A1* | 5/2014 | Goodman | F24S 25/16 |
| | | | 136/251 |
| 2016/0380581 A1 | 12/2016 | Kawakatsu | |
| 2019/0158014 A1 | 5/2019 | Goodman et al. | |
| 2021/0281211 A1* | 9/2021 | Tyler | H02S 20/10 |
| 2023/0402957 A1* | 12/2023 | Anderson | H02S 30/20 |

* cited by examiner

APPARATUSES, SYSTEMS, AND METHODS FOR WIND-RESILIENT SOLAR ARRAY FIELDS

CROSS REFERENCE TO RELATED APPLICATION

This application claims the benefit of U.S. Provisional Patent Application No. 63/415,803 filed on Oct. 13, 2022, which is hereby incorporated by reference in its entirety.

STATEMENT REGARDING FEDERALLY SPONSORED RESEARCH OR DEVELOPMENT

This invention was made with Government support under Award Number DE-SC0020038 awarded by the U.S. Department of Energy Office of Science. The Government has certain rights in this invention.

FIELD OF THE INVENTION

Disclosed are apparatuses, systems, and methodologies for wind-resilient, efficient, solar array fields.

BACKGROUND

Structural wind loads commonly govern the material requirements of solar panel racking systems and structures (e.g., solar canopies, flat roof racking systems, ground-mount racking systems, etc.). Flat roof solar panel racking systems are mounted directly onto a flat roof, whereas the solar panels in solar canopies are mounted generally between 2 and 15 feet off of the ground. Solar canopy technologies may, for example, be used in any open public or private spaces such as parking lots, parks, sidewalks, playgrounds, parking garages, covered markets, equipment storage facilities, etc. Ground-mount racking systems are typically mounted low to the ground—between 1 and 7 feet off of the ground. Racking structures for supporting solar panels are also often installed in multi-structure sets of arrays called "fields." Ordinarily, solar array fields consist of ground-mount racking systems, frequently made up of solar tracker-type racking systems.

Depending on site location and relative exposure, solar array fields can undergo significant wind forces like those experienced in a category 5 hurricane. Destruction or failure of solar panel racking structures can occur in such winds, and such destruction or failure can have catastrophic impact, causing costly and sometimes life-threatening power failures. Accordingly, by conventional means, individual racking structures residing within said array fields must be constructed of strong, largely rigid materials to withstand high winds. Such strong and rigid racking structures are expensive in two senses: 1) they require greater amounts of material and are often more complicated in structure (meaning increased complexity and expense for manufacture, assembly, and installation); and 2) they prohibit the use of solar tracker racking structures, which improve solar panel efficiency by moving solar panels with the sun, thus collecting a greater amount of solar energy per panel. Because of their moving parts and other inherent qualities of their structures, solar tracker racking structures are notoriously weak in resistance to high wind.

Therefore, there is a long-felt and unresolved need for an apparatus, system, and method for providing solar array fields that allow for the efficiency of less expensive, less substantial rigid racking structures and/or improved energy collection via the use of solar tracker structures, while simultaneously maintaining or improving an array fields' ability to withstand applied wind loads and/or effectively reduce wind loads. In view of the foregoing, the present invention relates to improvements upon the known apparatuses, systems, and methods with respect to reduction of applied wind loads, ability to withstand wind loads, and efficiency in solar array fields.

SUMMARY

In response to the difficulties and problems encountered in the industry, an efficient, effective, and inexpensive apparatus, system, and methodology for providing solar array fields has been invented.

In accordance with aspects of certain embodiments of the present invention, the solar array field may include perimeter solar panel racking structures forming at least a portion of a perimeter of the solar array field and core solar panel racking structures. The perimeter solar panel racking structures may be rigid and have a shielding effect such that core solar panel racking structures experience reduced wind forces relative to wind forces applied to the perimeter solar panel racking structures. Each perimeter solar panel racking structure may include a first solar panel racking unit supporting a first set of solar panels and a second solar panel racking unit supporting a second set of solar panels. Each perimeter solar panel racking structure may form a tent-like shape. Additionally, the first set of solar panels may form a plane having a magnitude of a tilt angle, $\theta a$, formed between the first set of solar panels and the horizon and the second set of solar panels may form a plane having a magnitude of a tilt angle, $\theta b$, formed between the second set of solar panels and the horizon. The tilt angle, $\theta a$, and the tilt angle, $\theta b$, may be between 7 and 28 degrees.

In accordance with aspects of certain embodiments of the present invention, each perimeter solar panel racking structure may include first and second solar racking units, each having a base assembly and an upper panel mount assembly. Each perimeter solar panel racking structure further may include a first and second set of solar panels, wherein the first set of solar panels may be secured to the upper panel mount assembly of the first solar racking unit and the second set of solar panels may be secured to the upper panel mount assembly of the second solar racking unit. The perimeter solar panel racking structures may also each include at least first and second cross-braces, wherein the first cross-brace attaches the base assembly of the first solar racking unit to the upper panel mount assembly of the second solar racking unit and the second cross-brace attaches the base assembly of the second solar racking unit to the upper panel mount assembly of the first solar racking unit. Further, the first and second set of solar panels may each slope upward toward a midpoint line between the first solar racking unit and the second solar racking unit such that the solar panel racking structure forms a tent-like structure.

In accordance with aspects of certain embodiments of the present invention, each perimeter solar panel racking structure may include may include a first solar racking unit including a base assembly having at least first and second base members, and an upper panel mount assembly having an outer upper chord and an inner upper chord, a lower chord, at least first and second web strut clusters, at least first and second ground strut clusters, and at least first and second transverse struts, wherein each of the first and second transverse struts of the first solar racking unit connects the outer upper chord of the first solar racking unit to the inner upper chord of the first solar racking unit. Each perimeter solar panel racking structure may further include a second solar racking unit including a base assembly having at least first and second base members, and an upper panel mount assembly having an outer upper chord and an inner upper chord, a lower chord, at least first and second web strut clusters, at least first and second ground strut clusters, and at least first and second transverse struts, wherein each of the first and second transverse struts of the second solar racking unit connects the outer upper chord of the second solar racking unit to the inner upper chord of the second solar racking unit. The perimeter solar panel racking structure may further include at least first and second cross-braces, wherein the first cross-brace attaches the first base member of the first solar racking unit to the inner upper chord of the second solar racking unit and the second cross-brace attaches the first base member of the second solar racking unit to the inner upper chord of the first solar racking unit. Each web strut cluster of each solar racking unit may attach the lower chord to the inner and outer upper chords of each, respective solar racking unit. The first ground strut cluster of each solar racking unit may attach the first base member to the inner and outer upper chords of each, respective solar racking unit, and the second ground strut cluster of each solar racking unit may attach the second base member to the inner and outer upper chords of each, respective solar racking unit. Each perimeter solar panel racking structure may further include third and fourth web strut clusters.

In certain embodiments, at least a portion of the perimeter may be formed by a plurality of the perimeter solar panel racking structures that are arranged at least two rows deep into the array field. Further, the solar array field further may include row gaps between adjacent rows of the plurality of the perimeter solar panel racking structures. The row gaps may be between about 10 inches and about 90 inches in length.

The solar array field of the present invention may include between about 10-50% perimeter solar panel racking structures as a percentage of the total number of solar panel racking structures in the solar array field. In some embodiments, at least about 30% of all perimeter solar panel racking structures in the array field may be located on a windward border of the solar array field. In certain further embodiments, the solar array field may further include side gaps between adjacent perimeter solar panel racking structures. The side gaps may be between about 0.5 inches and about 10 inches in length. Further, the solar array field may further include drive aisles. The drive aisles may preferably be no more than 20 feet in width.

In some embodiments, the core solar panel racking structures may be solar tracker racking structures, triangular truss racking structures, racking structures that are the same structure as the perimeter solar panel racking structures, or combinations thereof. The core solar panel racking structures may experience an average normal force coefficient GCn for uplift that is about 68% of the average normal force coefficient for uplift experienced by perimeter solar panel racking structures or less, as measured according to ASCE 49-21 and calculated according to ASCE 7-16 under category-5 hurricane force wind conditions. Further, the core solar panel racking structures may experience effective wind speeds of about 125 mph or less when the solar array field as a whole is exposed to category-5 hurricane force wind conditions, as measured according to ASCE 49-21 and calculated according to ASCE 7-16.

The perimeter solar panel racking structure may include a gap between an uppermost edge of the first set of solar panels and an uppermost edge of the second set of solar panels. The gap may be between about 8 and about 40 inches wide. Each solar racking unit of a perimeter solar panel racking structure preferably defines a width dimension, W, and a length dimension, L, with each dimension bounded by the surface area of an upper face of each set of solar panels, thus defining an aspect ratio for each solar racking unit, W:L. The aspect ratio of each solar racking unit may be less than 0.7. W for each solar racking unit may be between about 10 feet and about 27 feet and L for each solar racking unit may be between about 44 feet and about 110 feet. In some embodiments, the perimeter solar panel racking structures may be more wind tolerant than the core solar panel racking structures.

The disclosure of the present invention provides a system for providing a solar array field having improved solar collection efficiency. The system may include perimeter solar panel racking structures forming at least a portion of a perimeter of a solar array field and core solar panel racking structures forming a remainder of the solar array field. The perimeter solar panel racking structures may be rigid and have a shielding effect such that core solar panel racking structures experience reduced wind forces relative to wind forces applied to the entire solar array field. The system may include any perimeter solar panel racking structures set forth herein. Further, the system may include any core solar panel racking structures set forth herein.

The disclosure of the present invention provides a method for assembling a solar array field in accordance with any of the solar array field embodiments described herein. For example, the method for assembling a solar array field may include the steps of A) providing perimeter solar panel racking structures, wherein perimeter solar panel racking structures are preferably rigid; (B) providing core solar panel racking structures, wherein the core solar panel racking structures may be less wind tolerant than the perimeter solar panel racking structures; and (C) securing the perimeter solar panel racking structures around a significant portion of a perimeter formed by the core solar panel racking structures to form a solar array field. The core solar panel racking structures preferably experience reduced wind forces relative to wind forces applied to the entire solar array field. The method may include any perimeter solar panel racking structures set forth herein. Further, the method may include any core solar panel racking structures set forth herein.

The details of one or more examples are set forth in the accompanying drawings and the description below. Other features, objects, and advantages of the disclosure will be apparent from the description and drawings, and from the claims.

DETAILED DESCRIPTION

Figure 1:
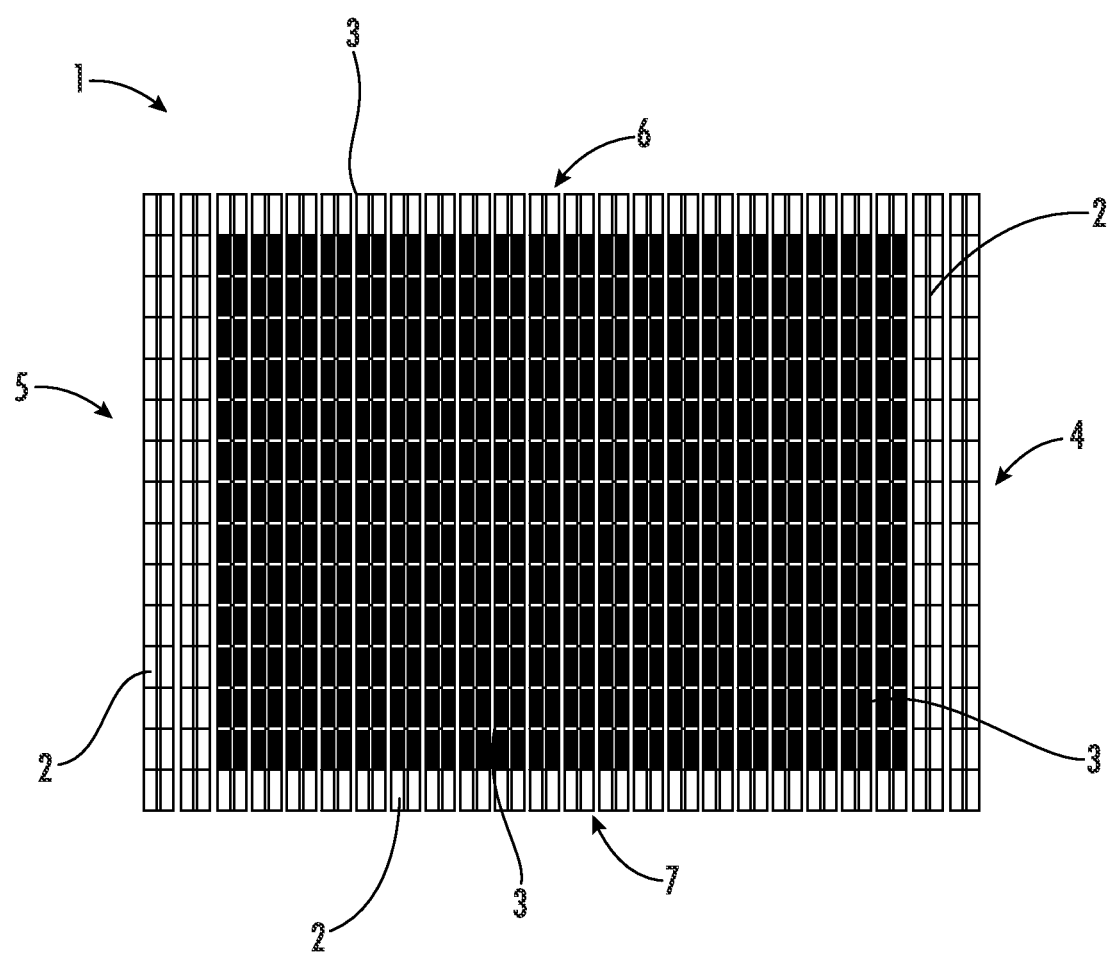
FIG. 1 is a top-down, schematic view of a solar array field in accordance with examples of this disclosure.

Reference will now be made in detail to various embodiments of the invention, one or more examples of which are illustrated in the drawings. Each example is provided by way of explanation of the invention, and is not meant as a limitation of the invention. For example, features illustrated or described as part of one embodiment may be used with a second embodiment to yield a third embodiment. It is intended that the present application include such modifications and variations as come within the scope and spirit of the invention. Repeat use of reference characters throughout the present specification and appended drawings is intended to represent the same or analogous features or elements of the invention.

Before any embodiments of the invention are explained in detail, it is to be understood that the invention is not limited in its application to the details of construction or to the arrangement of components set forth in the following description or illustrated in the drawings. The invention is capable of other embodiments and of being practiced or of being carried out in various ways. Also, it is to be understood that the phraseology used herein is for the purpose of description and should not be regarded as limiting. The use of formatives of the words "include," "comprise," and "have" is meant to encompass the items listed thereafter and equivalents thereof, as well as additional items. Unless specified or limited otherwise, the terms "connected" and "carried by" are used broadly and encompass direct and indirect mountings, connections, supports, or couplings. Further, such phraseology is not limited to physical or mechanical connections or couplings.

The recitation of a numerical range using endpoints includes all numbers subsumed within that range, including rounding (e.g., 1 to 5 includes 1, 1.5, 2, 2.75, 3, 3.80, 4, 5, etc.).

The terms "a," "an," "the," "at least one," and "one or more" are used interchangeably. Thus, for example, a solar panel racking structure that contains "a" support member means that the solar panel racking structure includes "one or more" support members.

As used herein, the term "about" when applied to a value should be interpreted in context to suggest said value further encompasses a modest amount beyond the exact value, as would be understood by a person having ordinary skill in the art in light of this disclosure.

The term "field(s)" or "array field(s)" means a collection of solar panel racking structures, including solar panels positioned thereon, located in situ and arranged for solar energy collection. "Field(s)" or "array field(s)" may refer to a collection of any type or a mixture of types of solar panel racking or support structures (e.g., ground-mount, roof-mount, canopy, stationary, solar tracker, etc.).

The term "in situ" means as applied to a subject solar panel racking structure or component thereof that said solar panel racking structure or component thereof is at the site of its intended installation, either fully installed or in preparation for installation, as context may dictate.

As used herein, the term "substantially equivalent" when applied with respect to a set of values means each value within the set falls within a range having an upper bound that is 5% greater than an average of the set of values and a lower bound that is 5% lower than the average of the set of values.

The term "uplift force" refers to the force exerted by wind on the underside of a solar panel racking structure. The uplift force or an associated normal force coefficient imparted by wind on the underside of conventional solar panel racking structures is expected by those of ordinary skill in the art to decrease with an increasing tilt angle of solar panels mounted on conventional solar panel racking structures.

The term "significant portion" means a portion that is 50% or greater than the whole.

Aspects of the present disclosure generally relate to apparatuses, systems, and methods for providing fields of solar panel racking structures having efficiencies in using less expensive, less substantial rigid racking structures or via improved energy collection through the use of solar tracker structures, or both, while simultaneously maintaining or improving the ability of the array fields over conventional array fields to withstand applied wind loads. Generally, the disclosed apparatuses, systems, and methods utilize improved arrangements of solar array fields. In various embodiments, all or a portion of the perimeter of a solar array field may be provided with rigid, structurally robust solar panel racking structures ("perimeter solar panel racking structures") that reduce the pressure or wind forces experienced by racking structures located in a core of the field. "Core solar panel racking structures" refer to all solar panel racking structures in a solar array field apart from those perimeter solar panel racking structures. The described arrangement and reduction of pressure or wind forces experienced by core solar panel racking structures allows for the inclusion in solar array fields of inexpensive solar panel racking structures, solar panel racking structures providing greater solar efficiency (e.g., solar trackers), or other features to improve solar collection efficiency and reliability where high wind force conditions are possible in order to improve the overall utility of a given solar array field.

Solar Array Field

Referring to FIG. 1, a top-down, schematic view of a solar array field 1 in accordance with an exemplary embodiment of this disclosure is shown. In FIG. 1, perimeter solar panel racking structures 2 surround an entire perimeter of solar array field 1. At east and west borders 4, 5 of the solar array field 1, perimeter solar panel racking structures 2 are two rows deep. At north and south borders 6, 7, perimeter solar panel racking structures 2 are one row deep. Solar array field 1 further includes core solar panel racking structures 3.

In various embodiments, the borders of solar array field 1 need not be limited to east, west, north, and south borders 4, 5, 6, 7 and may instead be of any suitable number forming any suitable shape for a particular site or as selected by the designer of a solar array field. Where a solar array field is not rectangular, "borders" as used herein, may refer to any outer edge of the solar array field formed of at least one solar panel racking structure.

In various embodiments, perimeter solar panel racking structures 2 form at least a portion of the outer perimeter of a solar array field. Perimeter solar panel racking structures 2 may, in some embodiments, form only a portion of any one border of a solar array field, with core solar panel racking units 3 forming the balance of the outer perimeter. In certain embodiments, perimeter solar panel racking structures 2 may be arranged at most one row deep on any given border of the solar array field. In some embodiments, perimeter solar panel racking structures 2 may be arranged at most two rows deep on any given border of the solar array field. In further embodiments, perimeter solar panel racking structures 2 may be arranged at most three rows deep on any given border of the solar array field. In yet further embodiments, perimeter solar panel racking structures 2 may be arranged at most four rows deep on any given border of the solar array field. In certain embodiments, perimeter solar panel racking structures 2 may be concentrated on a windward border (as will be readily identifiable by a person having ordinary skill in the art with respect to a particular site) relative to leeward borders or borders having lesser wind exposure. In some embodiments, at least 30% of perimeter solar panel racking structures 2 in a solar array field may be located on a windward border. In certain embodiments, at least 35% of perimeter solar panel racking structures may be located on a windward border. In such embodiments and for purposes of determining the percentage of perimeter solar panel racking structures located on a windward border, perimeter solar panel racking structures located on a windward border include both those perimeter solar panel racking structures making up the windward border and those perimeter solar panel racking structures of any second, third, fourth, or more rows behind the perimeter solar panel racking structures forming the windward border (i.e., perimeter solar panel racking structures immediately adjacent to the perimeter solar panel racking structures making up the outermost windward border, perimeter solar panel racking structures immediately adjacent to those, and so on).

Figure 2:
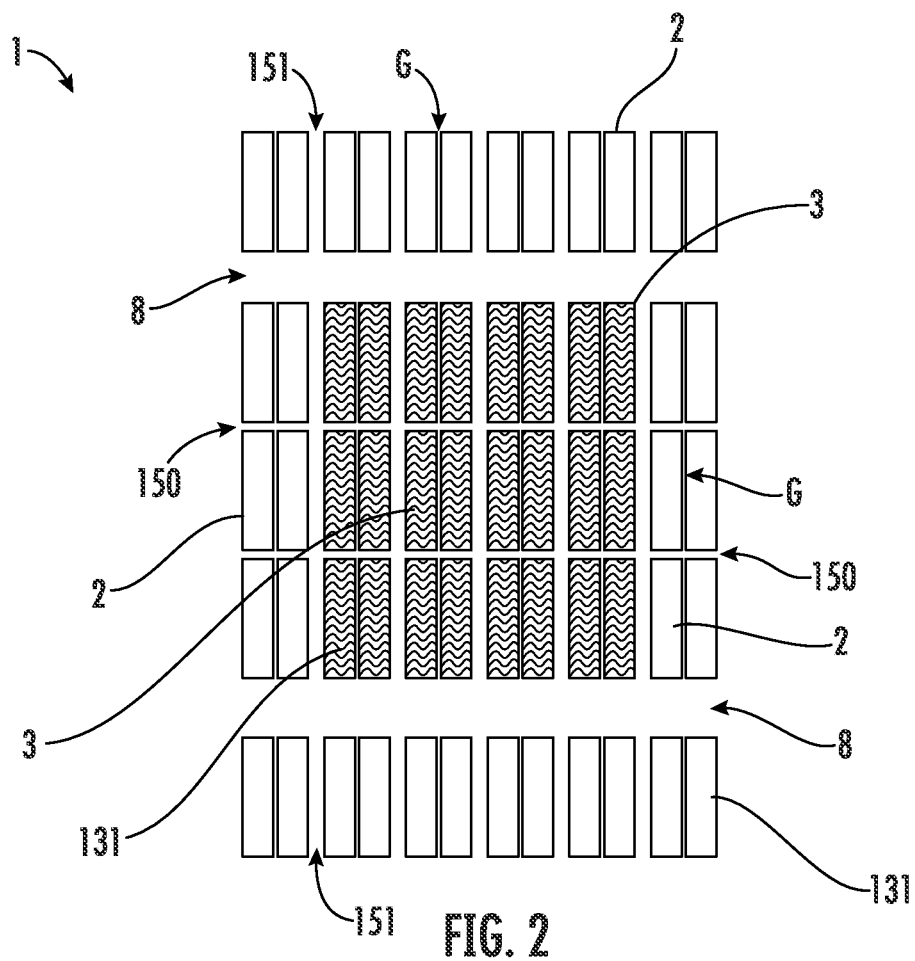
FIG. 2 is a top-down, schematic view of a solar array field in accordance with examples of this disclosure.

Referring to FIG. 2, a top-down, diagrammatic view of an exemplary solar array field 1 is shown. In embodiments, solar array field 1 includes perimeter solar panel racking structures 2 and core solar panel racking structures 3, all bearing solar panels 131. Drive aisles 8 may be provided between solar panel racking structures. Side gaps 150 may be provided between adjacent perimeter solar panel racking structures. Where a border includes perimeter solar panel racking structures that are more than one row deep, row gaps 151 may be provided. Similar side and row gaps (not identified) may be also present between perimeter solar panel racking structures 2 and core solar panel racking structures 3, as well as between two core solar panel racking structures 3. The solar panel racking structures 2, 3 of FIG. 2 may further include gap G between adjacent solar panel racking units (not labeled) of a single solar panel racking structure 2, 3.

In preferred embodiments, the solar array field may include side gaps 150 that are preferably at least about half an inch in length, in further preferred embodiments, at least about 3 inches in length, and in yet further preferred embodiments, at least about 4 inches in length. In preferred embodiments, side gaps 150 may be at most about 11 inches in length, in further preferred embodiments, at most about 10 inches in length, and in yet further preferred embodiments, at most about 8 inches in length. The length of side gap 150 is measured from an outer edge of a set of solar panels of one perimeter solar panel racking structure across a side gap 150 to an outer edge of a set of solar panels of an adjacent perimeter solar panel racking structure.

In preferred embodiments in which perimeter solar panel racking structures are provided more than one row deep, the solar array field may include row gaps 151 that may be at least about 10 inches in length, in further preferred embodiments, at least about 30 inches in length, and in yet further preferred embodiments, at least about 40 inches in length. In preferred embodiments in which perimeter solar panel racking structures are provided more than one row deep, row gaps 151 may preferably be at most about 90 inches in length, in further preferred embodiments, at most about 86 inches in length, and in yet further preferred embodiments, at most about 70 inches in length. The length of row gap 151 is measured from an outer edge of a set of solar panels of one perimeter solar panel racking structure across a row gap to an outer edge of a set of solar panels of an adjacent perimeter solar panel racking structure.

In preferred embodiments, drive aisles 8 may preferably be no larger than 250 inches in width. The width of drive aisle 8 is measured from an outer edge of a set of solar panels of one solar panel racking structure to an outer edge of a set of solar panels of an adjacent solar panel racking structure, across a drive aisle.

The relative height of perimeter solar panel racking structures vs. core perimeter solar panel racking structures may vary depending on location within the solar array field, distance from perimeter, and local topography. Generally, shielding by perimeter solar panel racking structures will be limited for core solar panel racking structures having heights greater than such perimeter racking structures, though core solar panel racking structures closer to the center of an array field may experience lower wind forces at greater heights than do core solar panel racking structures of the same height that are closer to the perimeter. A person of ordinary skill in the art will further recognize in light of this disclosure that terrain and wind and sunlight exposure of a solar array field may also allow variations in height of the various solar panel racking units within a solar array field.

In various embodiments, perimeter solar panel racking structures may make up at least about 10% of the solar panel racking structures in a solar array field, in other embodiments, at least about 15%, in still other embodiments, at least about 25%, and in still other embodiments, at least about 27%. In various embodiments, perimeter solar panel racking structures may make up at most about 50% of the solar panel racking structures in a solar array field, in other embodiments, at most about 40%, in still other embodiments, at most about 35%, and in still other embodiments, at most about 30%. In such embodiments, the balance of the solar array field is made up of core solar panel racking structures or other devices useful for improving the efficiency, reliability, or durability of the solar array field. A person having ordinary skill in the art will recognize in light of this disclosure that it may be advantageous to minimize the number of perimeter solar panel racking structures in a given array field where appropriate shielding of core solar panel racking structures is maintained, given the cost and efficiency advantages that can be obtained by increasing the number of core solar panel racking structures in a given array field.

In various embodiments, the solar array field may include sufficient spacing between solar panel racking structures to allow for drive aisles between structures for maintenance access.

In preferred embodiments, core solar panel racking structures experience reduced wind uplift forces as compared to the uplift forces from wind on the outermost perimeter solar panel racking structures of an array field. In various embodiments, core solar panel racking structures may experience wind uplift forces of at most 68% of those wind uplift forces experienced by the outermost perimeter solar panel racking structures, as measured according to ASCE 49-21 ("Wind Tunnel Testing for Buildings and Other Structures") and calculated according to ASCE 7-16 ("Minimum Design Loads and Associated Criteria for Buildings and Other Structures") when the outermost perimeter solar panel racking structures are exposed to winds in excess of category 5 hurricane force winds. In further embodiments, core solar panel racking structures may experience wind uplift forces of at most 75% of those wind uplift forces experienced by the outermost perimeter solar panel racking structures, as measured according to ASCE 49-21 and calculated according to ASCE 7-16 when the outermost perimeter solar panel racking structures are exposed to winds in excess of category 5 hurricane force winds. In further embodiments, core solar panel racking structures may experience wind uplift forces of at most 85% of those wind uplift forces experienced by the outermost perimeter solar panel racking structures, as measured according to ASCE 49-21 and calculated according to ASCE 7-16 when the outermost perimeter solar panel racking structures are exposed to winds in excess of category 5 hurricane force winds. In further embodiments, core solar panel racking structures may experience wind uplift forces of at most 90% of those wind uplift forces experienced by the outermost perimeter solar panel racking structures, as measured according to ASCE 49-21 and calculated according to ASCE 7-16 when the outermost perimeter solar panel racking structures are exposed to winds in excess of category 5 hurricane force winds.

In various embodiments, the core solar panel racking structures may experience the equivalent of 125 mph winds or less when the outermost perimeter solar panel racking structures of a solar array field are exposed to 183 mph winds as measured according to ASCE 49-21 and calculated according to ASCE 7-16. In further embodiments, the core solar panel racking structures may experience the equivalent of 137 mph winds or less when the outermost perimeter solar panel racking structures of a solar array field are exposed to 183 mph winds as measured according to ASCE 49-21 and calculated according to ASCE 7-16. In further embodiments, the core solar panel racking structures may experience the equivalent of 155 mph winds or less when the outermost perimeter solar panel racking structures of a solar array field are exposed to 183 mph winds as measured according to ASCE 49-21 and calculated according to ASCE 7-16. In further embodiments, the core solar panel racking structures may experience the equivalent of 165 mph winds or less when the outermost perimeter solar panel racking structures of a solar array field are exposed to 183 mph winds as measured according to ASCE 49-21 and calculated according to ASCE 7-16.

Perimeter Solar Panel Racking Structures

The perimeter solar panel racking structures of the present disclosure may be of any useful, rigid structure that supports solar panels and establishes a wind shield for core solar panel racking structures, thus allowing the use of core solar panel racking structures providing improved solar collection, cost, or other efficiencies. Perimeter solar panel racking structures may be more wind tolerant than the core solar panel racking structures.

In exemplary embodiments, perimeter solar panel racking structures may each be made up of solar racking units, the solar racking units may include a base assembly and an upper panel mount assembly. The upper panel mount assembly may be preferably capable of bearing at least one solar panel.

In preferred embodiments, each perimeter solar panel racking structure may be composed of two solar racking units and a first solar racking unit supports a first set of solar panels and a second solar racking unit supports a second set of solar panels. The two solar racking units may be coupled via cross-bracing. The first and second sets of solar panels preferably form a tent-like structure, with each of the first and second sets of solar panels sloping in an upward direction to a midline formed between the two sets of solar panels along a length of the solar racking units.

In certain embodiments, the upper panel mount assembly may include two upper chords (upon which at least one solar panel may be mounted directly or indirectly), an inner upper chord and an outer upper chord, and one lower chord, between which and to which various strut supports are attached. In various embodiments, the upper and lower chords of the upper panel mount assembly may run the length of each solar racking unit. At one end of the solar racking unit, in one embodiment, a first ground strut cluster has at least one ground strut that may be used to attach the upper panel mount assembly to a first base member of the base assembly. In preferred embodiments, each ground strut may attach to the first base member and an upper chord. Similarly, at the other end of the solar racking unit, in one embodiment, a second ground strut cluster having at least one ground strut may be used to attach the upper panel mount assembly to a second base member of the base assembly. In preferred embodiments, each ground strut of the second ground strut cluster may attach to the second base member and an upper chord. In further embodiments, additional ground strut clusters may be used to further attach the upper panel mount assembly to the base assembly at first, second, or additional base members.

At one end of each solar racking unit of some embodiments, a first web strut cluster may include at least two web struts used to attach the upper chords to the lower chord. A first web strut of the first web strut cluster preferably attaches the lower chord to the first upper chord, and a second web strut of the first web strut cluster preferably attaches the lower chord to the second upper chord. The first web strut cluster may also include additional web struts that each attach the lower chord to an upper chord. In a preferred embodiment, the first web strut cluster includes four web struts, and first and third web struts of the first web strut cluster attach the lower chord to the first upper chord, and second and fourth web struts of the first web strut cluster attach the lower chord to the second upper chord. Similarly, at the other end of each solar racking unit, in one embodiment, a second web strut cluster having at least two web struts may be used to further attach the upper chords to the lower chord. A fifth web strut of the second web strut cluster preferably attaches the lower chord to the first upper chord, and a sixth web strut of the second web strut cluster preferably attaches the lower chord to the second upper chord. The second web strut cluster may include additional web struts that may each attach the lower chord to an upper chord. In a preferred embodiment, the second web strut cluster may include four web struts, and fifth and seventh web struts of the second web strut cluster may attach the lower chord to the first upper chord, and sixth and eighth web struts of the second web strut cluster may attach the lower chord to the second upper chord. In further embodiments, the solar racking units may include additional such web strut clusters.

In various embodiments, ground strut clusters and web strut clusters may attach at various positions along the length of the perimeter solar panel racking structures.

In further embodiments, the upper panel mount assembly may include transverse and diagonal struts connecting and providing support for and between the upper chords of a single perimeter solar panel racking unit.

In some embodiments, solar panels are directly mounted onto or attached to the upper chords of each solar racking unit. In some embodiments, solar panels may be directly mounted onto or attached to the diagonal or transverse struts. In still further embodiments, the upper panel mount assembly may further include at least one panel rail or purlin that may be attached to the upper chords, transverse struts, or diagonal struts or are otherwise mounted onto the upper panel mount assembly. In such further embodiments, solar panels may be attached or affixed or maintained in place by the panel rails or purlins.

In preferred embodiments, the various components of the upper panel mount assembly are rigid. In further preferred embodiments, the various components of the upper panel mount assembly are composed of steel or other suitable material.

In some embodiments, each solar racking unit may include a base assembly that has at least one base member. A base member may have any number of suitable shapes or structures as is appropriate or otherwise effective for the ground or surface that the base member is attached to or on which the base member rests. Base members may also have varying shapes or structures as is appropriate or effective for connection with components of the upper panel mount assembly. In one embodiment, base members are each columnar and formed of concrete. In yet a further embodiment, each base assembly may include two base members. In a further preferred embodiment, each base assembly may include three base members. In the event that the base assembly includes more than one base member, each base member may be the same or different from other base members, varying in size, shape, material, or configuration. The base assemblies of two solar racking units within the same perimeter solar panel racking structure can, but need not be the same with respect to configuration, makeup, or the like.

In various embodiments, each solar racking unit of a single perimeter solar panel racking structure may be substantially identical in construction and configuration though each solar racking unit may be positioned or anchored in a different orientation according to embodiments described herein. In this way, ease of manufacturing can be achieved, where each unit uses the same component parts that have the same orientation, reducing the number or varieties of parts needed.

As will occur to one having ordinary skill in the art, this disclosure is not limited as to the number, configurations, or types of perimeter solar panel racking structures, solar racking units, solar panels, base assemblies, base members per base assembly, upper panel mount assemblies, base struts, web trusses or web truss struts, upper or lower chords, diagonal or transverse struts, purlins/panel rails, connectors including devises or other connectors, or cross-braces that may be used in association with the present disclosure.

Referring now to FIGS. 3-12 exemplary embodiments of solar panel racking units 15 and perimeter solar panel racking structures 10 are shown. Each depicted perimeter solar panel racking structure 10 includes two solar racking units 15.

Figure 3:
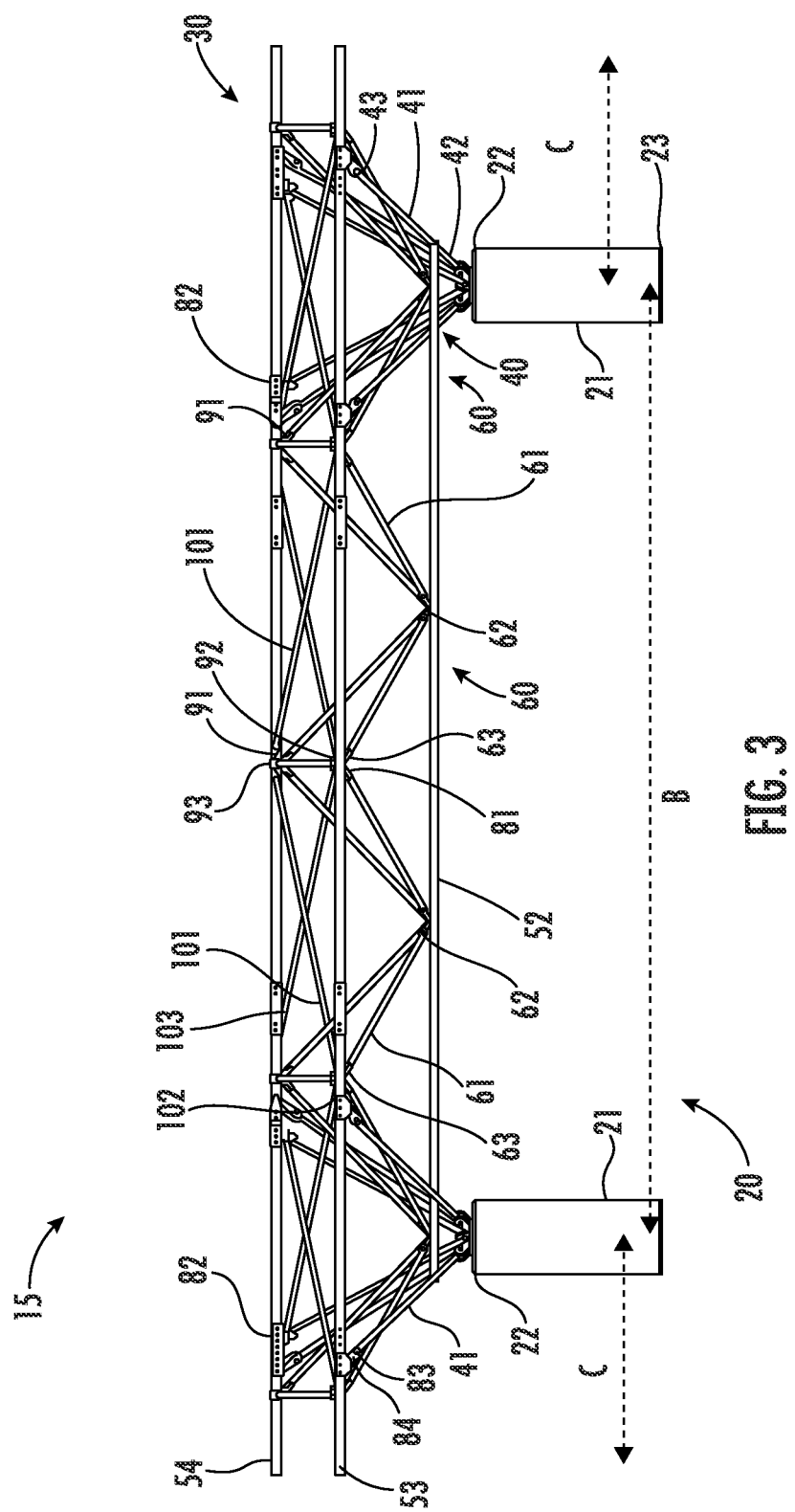
FIG. 3 is a longitudinal view of a solar racking unit including dashed lines to show dimensions, which may be used as a solar racking unit for a perimeter solar panel racking structure in accordance with examples of this disclosure.

Referring to FIG. 3, each solar racking unit 15 includes a base assembly 20 and an upper panel mount assembly 30. In certain embodiments, each base assembly 20 includes two columnar base members 21. Said columnar base members 21 may be formed of concrete and have a base member upper end 22 and a base member lower end 23.

Each upper panel mount assembly 30 depicted may include a lower chord 52, an outer upper chord 53, an inner upper chord 54, two ground strut clusters 40, and four web strut clusters 60. In certain embodiments, the inner upper chord 54 may be positioned higher in elevation relative to the horizon than the outer upper chord 53. Each of the inner upper chord 54, outer upper chord 53, and lower chord 52 may be substantially parallel. Ground strut clusters 40 may include at least one ground strut 41 connected at a ground strut lower end 42 to a base member upper end 22 and at a ground strut upper end 43 to an outer upper chord 53 or an inner upper chord 54. Web strut clusters 60 may include at least one web strut 61 connected at a web strut lower end 62 to a lower chord 52 and at a web strut upper end 63 to an outer upper chord 53 or an inner upper chord 54. In various embodiments, each upper panel mount assembly 30 further includes at least one transverse strut 91, which runs substantially perpendicular to and between outer upper chord 53 and inner upper chord 54. Each transverse strut 91 may be connected at a transverse strut outer end 92 to an outer upper chord 53 and at a transverse strut inner end 93 at an inner upper chord 54. In various embodiments, each upper panel mount assembly 30 may further include at least one diagonal strut 101, which runs at a diagonal to and between outer upper chord 53 and inner upper chord 54. Each diagonal strut 101 may be connected at a diagonal strut outer end 102 to an outer upper chord 53 and at a diagonal strut inner end 103 at an inner upper chord 54. In various embodiments including both at least one transverse strut 91 and at least one diagonal strut 101, a transverse strut outer end 92 may connect to an outer upper chord 53 at substantially the same location as does a diagonal strut outer end 102 and a transverse strut inner end 93 may connect to an inner upper chord 54 at substantially the same location as does a diagonal strut inner end 103. In various embodiments, a single solar racking unit 15 may include five transverse struts 91 and four diagonal struts 101, arranged to form a favorable pattern for load distribution as shown in FIGS.

3-4, with diagonal struts 101 installed between transverse struts 91 and one set of two diagonal struts 101 having an opposed orientation to the other set of two diagonal struts 101.

In certain embodiments, inner upper chord 54 may be preferably capable of bearing larger wind forces than outer upper chord 53 and lower chord 52, either by virtue of being thicker, being provided with a reinforced structure, by being formed of a more resilient material, or other suitable means. Without being bound to theory, inner upper chord 54 appears to bear greater loading from wind forces than do outer upper chord 53 and lower chord 52 in particular embodiments, and thus by increasing the load bearing capacity of inner upper chord 54 relative to the other two chords, smaller total expense can be made and optimum material efficiency achieved.

Figure 4:
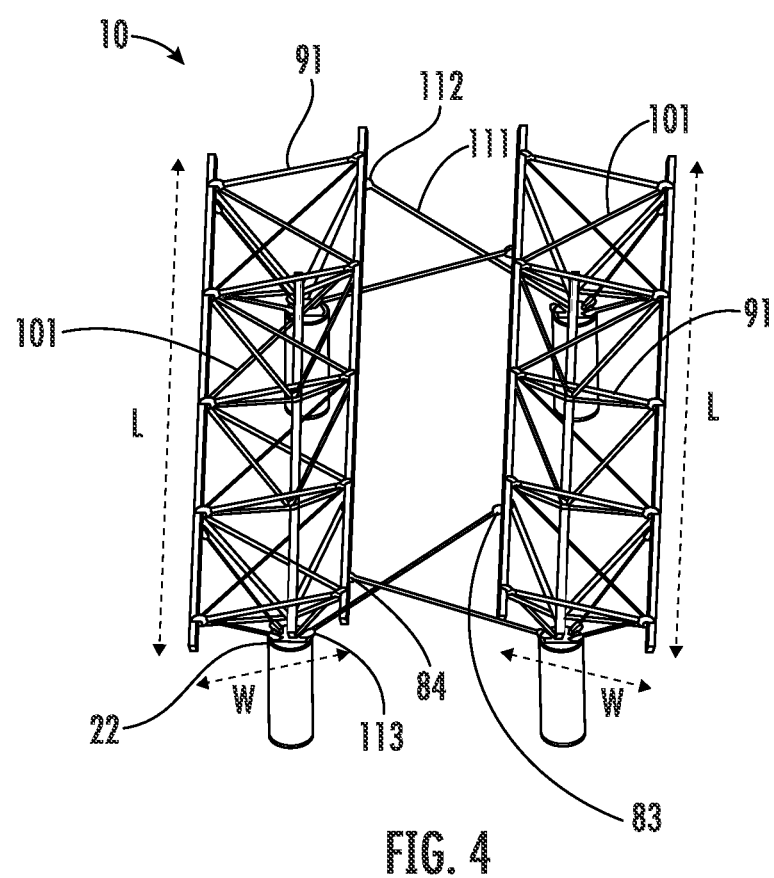
FIG. 4 is a top, side perspective view of a solar panel racking structure including dashed lines to show dimensions, which may be used as a perimeter solar panel racking structure in accordance with examples of this disclosure.
Figure 5:
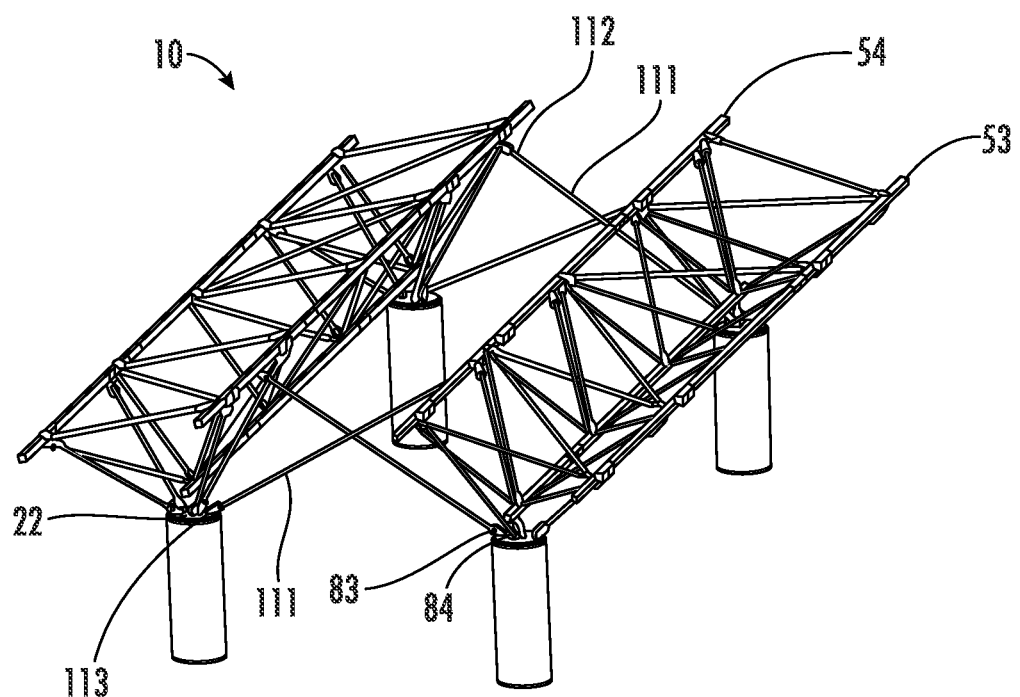
FIG. 5 is a top, side perspective view of solar panel racking structure, which may be used as a perimeter solar panel racking structure in accordance with examples of this disclosure.

In various embodiments, each ground strut 41, web strut 61, transverse strut 91, diagonal strut 101, and cross-brace 111, may be connected to the various other components of a solar racking unit 15 by any suitable connecting means 80. Exemplary strut configurations and suitable connecting means 80 may include those configurations identified in U.S. Pat. No. 9,882,524, which is herein incorporated by reference in its entirety. Suitable connecting means are also shown by way of example in FIG. 3, where web struts 61 are stamped at their ends 62, 63 to provide a flat portion 81 that can be placed flush with a surface of a lower chord 52, outer upper chord 53, or inner upper chord 54 and secured via at least one bolt (not pictured) through at least one hole (not pictured) in the web strut end 62, 63 passing directly into a hole (not pictured) in one of the lower chord 52, outer upper chord 53, or inner upper chord 54 or passing into a bracket (not pictured) attached to a chord 52, 53, 54 and secured with a nut (not pictured). Such an attachment may allow for the use of less overall material in the strut, or the reduction of the number of needed parts for making the attachment. Ground struts 41 may include a hole (not pictured) at either unstamped end 42, 43 through which passes a pin 83, attaching the web strut end 42, 43 to a clevis 84. Clevis 84 may in turn be connected by a bolt and hole, pin and hole, or other suitable connector (not shown) to outer upper chord 53, inner upper chord 54, or base member upper end 22 either directly, or via a connected bracket 82. In FIGS. 4 and 5, cross-braces 111 are similarly shown connected by a pin 83 and clevis 84 connection to an inner upper chord 54 at cross-brace upper end 112 and a base member upper end 22 at a cross-brace lower end 113. In one embodiment (not shown), to increase the structural integrity of the attachment points of the ground struts with the base members, the base members may be designed so that, after attaching the ground struts thereto, concrete (or other suitable material) may be poured over the attachment points of the ground struts to encase the attachment points in concrete.

As will be understood by one having ordinary skill in the art in light of this disclosure, each ground strut 41, web strut 61, transverse strut 91, diagonal strut 101, and cross-brace 111, may be connected to the various other components of a solar racking unit 15 by the described stamped end, bolt/hole/nut connection, the pin/clevis connector, welding, or other suitable attachment in a combination different from those combinations specifically shown herein. One having ordinary skill in the art will understand in light of this disclosure that an attachment that is "suitable" for certain connections in this context may mean that a particular connector must allow for and/or maintain an angled connection between components.

FIGS. 6-9 show solar panel racking units 15 wherein the units further include panel rails or purlins 141. As depicted, purlins 141 may be attached to outer upper chord 53 and inner upper chord 54 to provide a plane 132, 132a, 132b (shown by dashed lines in FIGS. 10-11 only) in which solar panels 131, 131a, 131b (shown in FIGS. 10-12 only) may rest. In alternative embodiments, purlins 141 may be attached to any of the outer upper chord 53, inner upper chord 54, diagonal struts 101, and transverse struts 91 or other feature of an underlying solar racking unit 15 so long as the purlins 141 so attached provide a secure attachment means for solar panels 131, 131a, 131b and allow attachment of solar panels 131, 131a, 131b substantially in plane 132, 132a, 132b.

Figure 9:
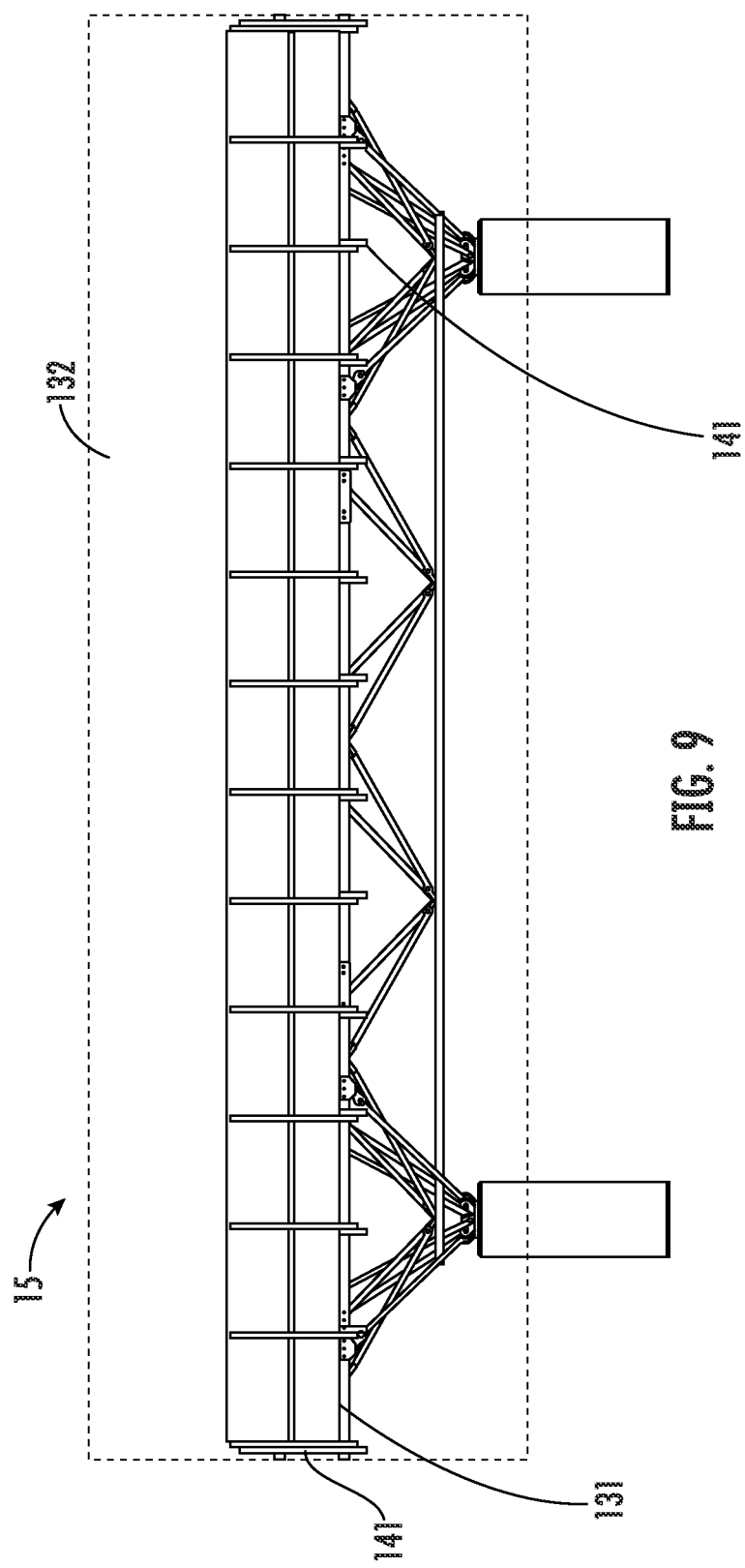
FIG. 9 is a longitudinal view of a solar racking unit including solar panels and an illustrative, imaginary plane, which may be used as a solar racking unit for a perimeter solar panel racking structure in accordance with examples of this disclosure.
Figure 10:
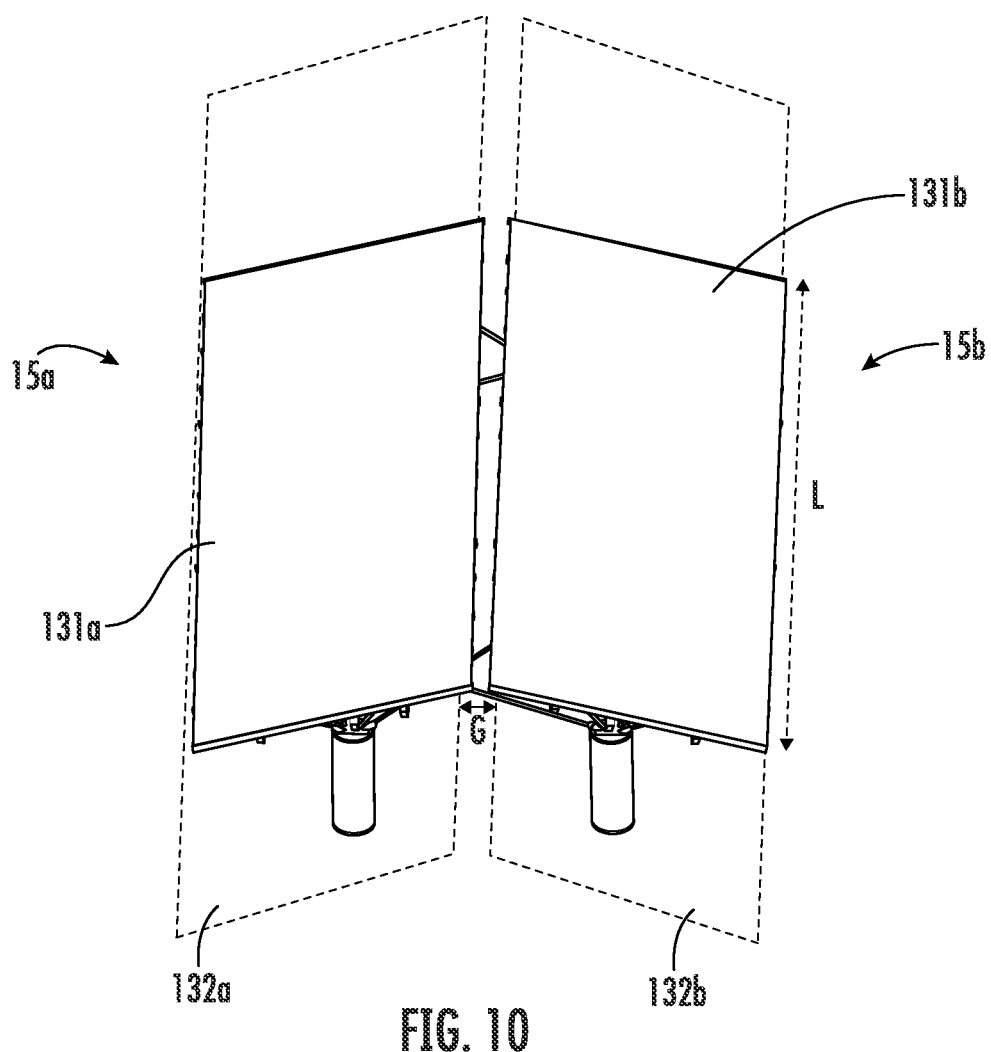
FIG. 10 is a top, side perspective view of a solar panel racking structure including solar panels, two illustrative, imaginary planes, and dashed lines to show dimensions, which may be used as a perimeter solar panel racking structure in accordance with examples of this disclosure.

As shown in FIGS. 9-10, each solar racking unit supports solar panels 131. Solar panels 131, 131a, 131b may reside in solar panel plane 132, 132a, 132b and be attached or fitted to purlins 141. Solar panels 131, 131a, 131b may also be attached by any suitable means to upper panel mounting assembly 30 directly (not shown). In various embodiments, solar panels 131, 131a, 131b are substantially rectangular in their top-down profile.

Figure 11:
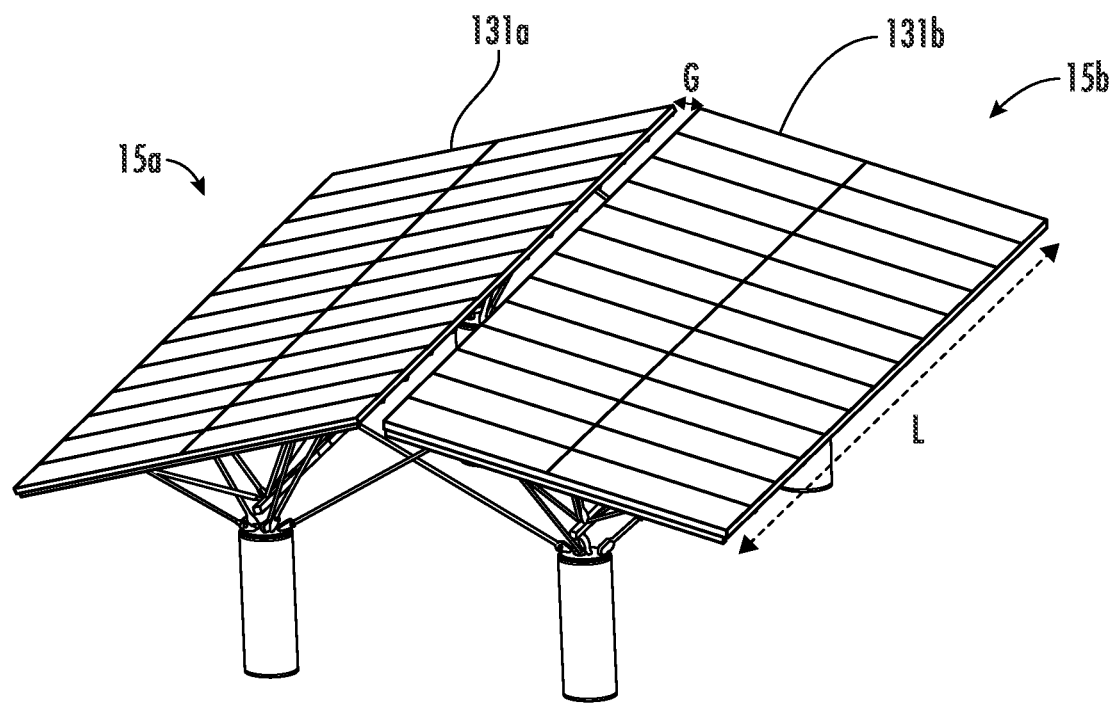
FIG. 11 is a top, side perspective view of a solar panel racking structure including solar panels and dashed lines to show dimensions, which may be used as a perimeter solar panel racking structure in accordance with examples of this disclosure.

Regarding FIG. 10, a first set of solar panels 131a of solar racking unit 15a may be supported such that it forms tilt angle, $\theta a$ (not shown), between solar panel plane 132a and an intersecting plane level with the horizon (not shown). A second set of solar panels 131b of solar racking unit 15b may be supported such that it forms angle, $\theta b$ (not shown), between solar panel plane 132b and an intersecting plane level with the horizon (not shown). The first and second sets of solar panels 131a, 131b form a tent-like structure, with each of the first and second sets of solar panels sloping in an upward direction toward a midline formed between the two sets of solar panels 131a, 131b and running the entirety of a length L of the solar racking units 15a, 15b. In various embodiments, $\theta a$ and $\theta b$ can be substantially equal in magnitude. In preferred embodiments, each of $\theta a$ and $\theta b$ may be greater than about 0 and up to about 30 degrees. In further embodiments, each of $\theta a$ and $\theta b$ may be between about 5 and about 30 degrees; in further preferred embodiments, between about 7 and about 28 degrees, in still further preferred embodiments, between about 10 and about 24 degrees, and in yet further preferred embodiments, between about 12 and about 18 degrees. The relative tilts of $\theta a$ and $\theta b$ may vary relative to one another as may be particularly useful for solar capture, given the characteristics of a particular site (sunlight exposure, terrain, etc.). In further preferred embodiments, perimeter solar panel racking structure 10 may be oriented in situ such that the first set of solar panels slopes upward from a substantially eastward direction to a substantially westward direction and the second set of solar panels slopes upward from a substantially westward direction to a substantially eastward direction. FIG. 11 shows the perimeter solar panel racking structure of FIG. 10 from an alternative, top, side, perspective view.

Figure 12:
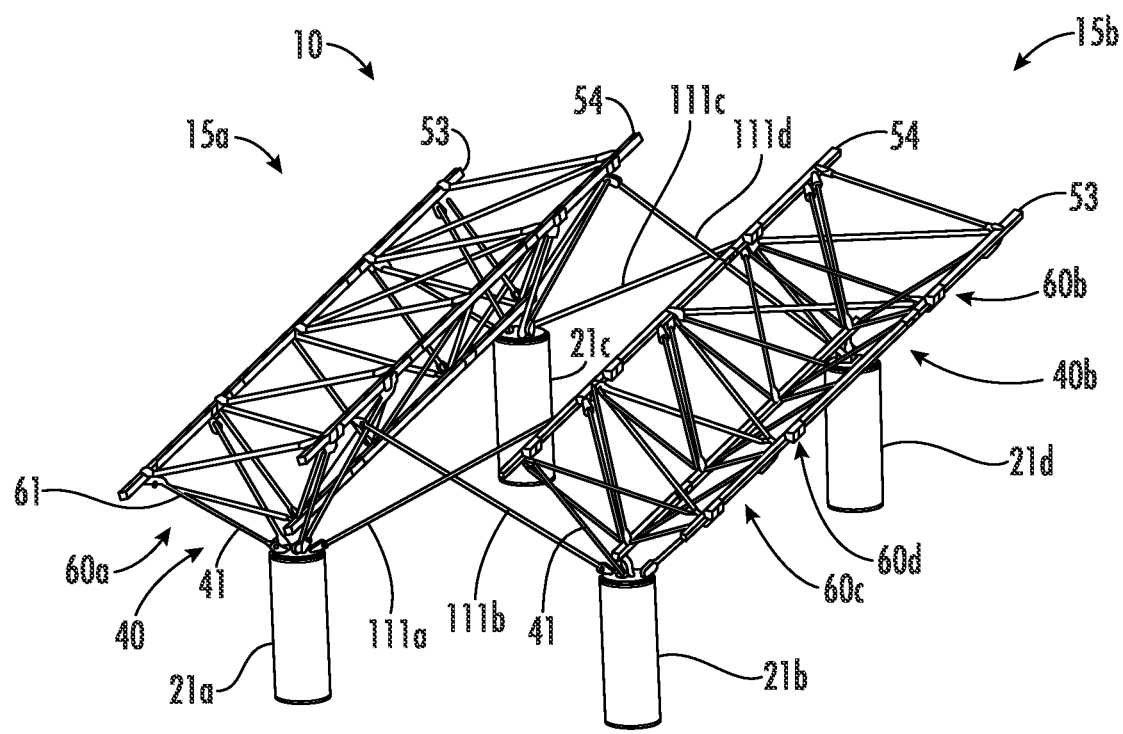
FIG. 12 is a top, side perspective view of a solar panel racking structure, which may be used as a perimeter solar panel racking structure in accordance with examples of this disclosure.

FIG. 12 shows two coupled solar racking units 15a, 15b forming a perimeter solar panel racking structure 10 having a tented structure. Solar racking units 15a, 15b are preferably coupled via cross-braces 111. In the figure, a first cross-brace 111a spans from a first base member 21a of a first solar racking unit 15a to the inner upper chord 54 of a second solar racking unit 15b. A second cross-brace 111b spans from a first base member 21b of a second solar racking unit 15b to the inner upper chord 54 of the first solar racking unit 15a. A third cross-brace 111c spans from a second base member 21c of the first solar racking unit 15a to the inner upper chord 54 of the second solar racking unit 15b. A fourth cross-brace 111d spans from a second base member 21d of the second solar racking unit 15b to the inner upper chord 54 of the first solar racking unit 15a. First and second cross-braces 111a, 111b and third and fourth cross-braces 111c, 111d are preferably offset relative to one another in terms of their attachment point along the length of their respect inner upper chord 54.

In each solar racking unit 15a, 15b, a first ground strut cluster 40a preferably connects the first base members 21a, 21b to their respective outer and inner upper chords 53, 54, and a second ground strut cluster 40b preferably connects the second base members 21c, 21d to their respective outer and inner upper chords 53,54. Each ground strut cluster 40 may include four ground struts 41. In each solar racking unit 15a, 15b, a first web strut cluster 60a preferably connects the lower chord 52 to its respective outer and inner upper chords 53, 54 at an end of the solar racking units 15a, 15b, a second web strut cluster 60b preferably connects the lower chord 52 to its respective outer and inner upper chords 53, 54 at an opposing end of the solar racking units 15a, 15b, a third web strut cluster 60c preferably connects the lower chord 52 to its respective outer and inner upper chords 53, 54 between the respective connections with outer and inner upper chords 53, 54 made by first and second web strut clusters 60a, 60b, and a fourth web strut cluster 60d preferably connects the lower chord 52 to its respective outer and inner upper chords 53, 54 between the respective connections with outer and inner upper chords 53, 54 made by second and third web strut clusters 60b, 60c. Each web strut cluster 60a, 60b, 60c, 60d may include four web struts 61.

In some embodiments, each solar racking unit of each perimeter solar panel racking structure may be coupled to the other via at least one cross-brace. In further embodiments, each solar racking unit of each perimeter solar panel racking structure may be coupled to the other via at least two cross-braces. In further embodiments, each perimeter solar panel racking unit of each perimeter solar panel racking structure may be coupled to the other via at least three cross-braces. In further embodiments, each solar racking unit of each perimeter solar panel racking structure may be coupled to the other via at least four cross-braces. In further embodiments, each solar racking unit of each perimeter solar panel racking structure may be coupled to the other via at least six cross-braces. In certain embodiments, each cross-brace may attach the base assembly of one solar racking unit to the upper panel mount assembly of the other solar racking unit in the same perimeter solar panel racking structure. In further embodiments, each cross-brace may attach the base assembly of one solar racking unit to the inner upper chord of the other solar racking unit in the same perimeter solar panel racking structure.

In preferred embodiments and as shown in FIGS. 10-11, a gap G may be formed between the uppermost edge of a first set of solar panels 131a on a first solar racking unit 15a and the uppermost edge of a second set of solar panels 131b on a second solar racking unit 15b, following length L of the first and second solar racking units 15a, 15b. In preferred embodiments, gap G may be between about 8 and about 40 inches wide. In further preferred embodiments, gap G may be between about 15 and about 35 inches wide, in still further preferred embodiments, between about 18 and about 30 inches wide, in still further preferred embodiments, between about 21 and about 28 inches wide, and in still further preferred embodiments, between about 23 and about 25 inches wide.

Figure 6:
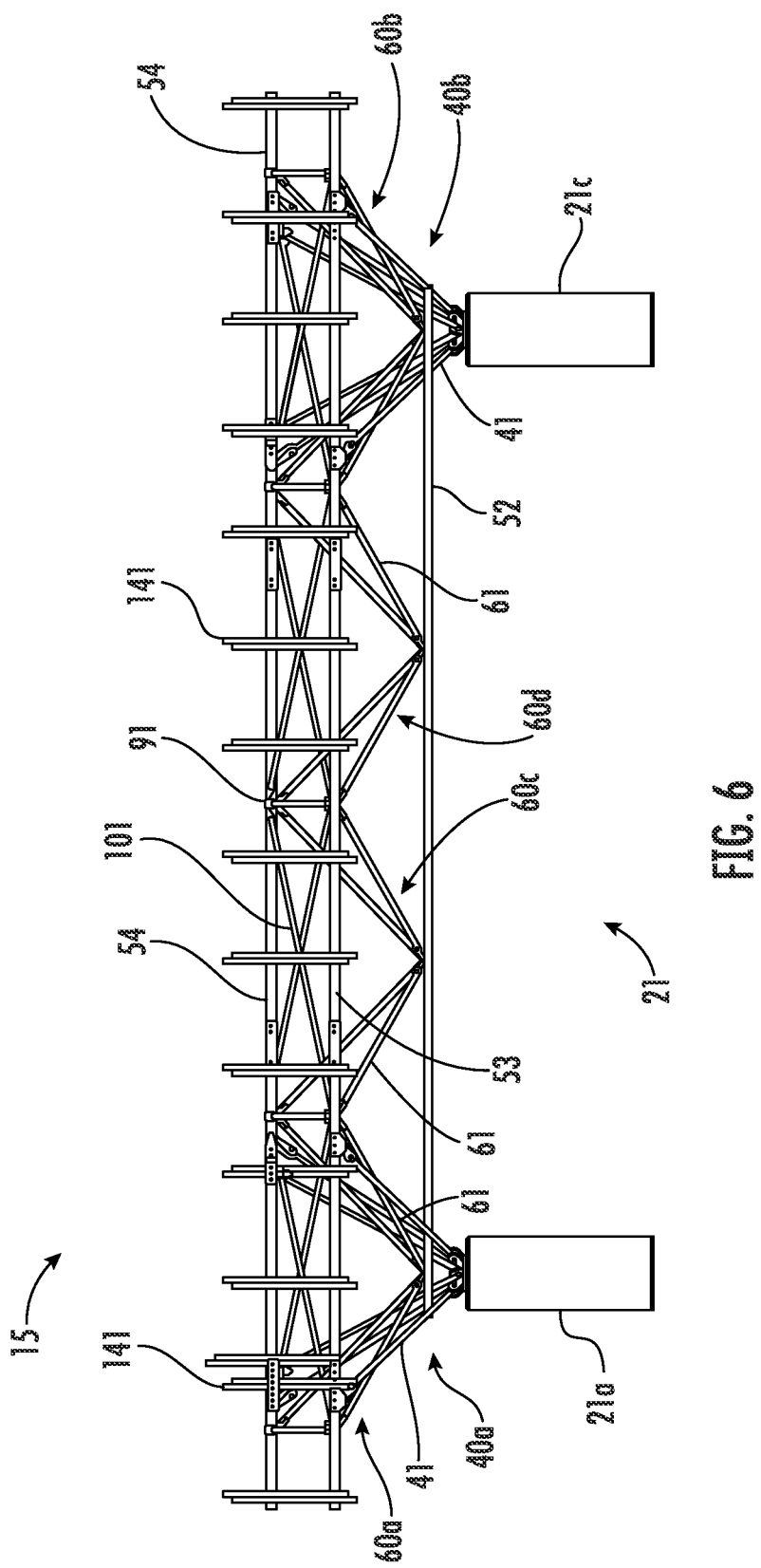
FIG. 6 is a latitudinal view of a solar racking unit including purlins, which may be used as a solar racking unit for a perimeter solar panel racking structure in accordance with examples of this disclosure.
Figure 7:
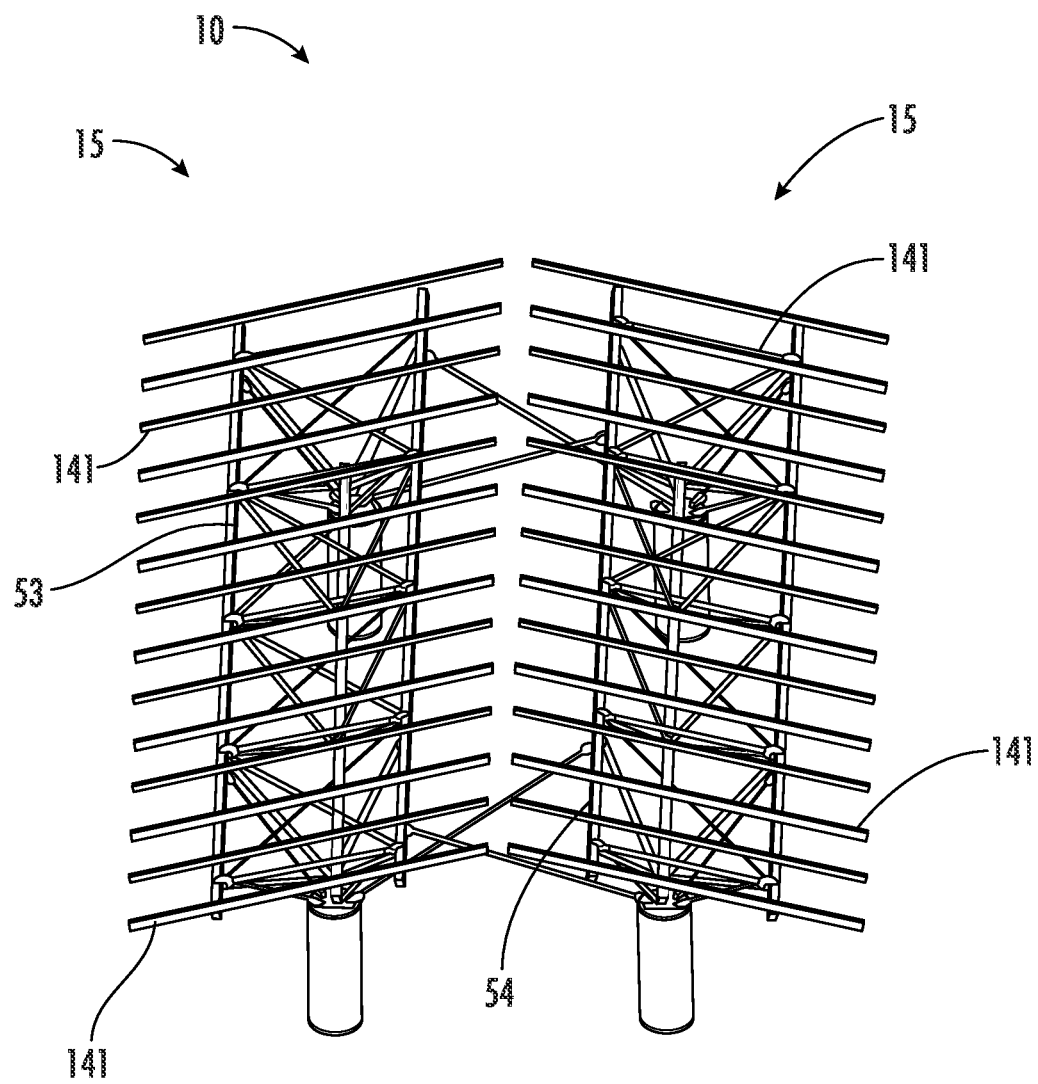
FIG. 7 is a top, side perspective view of a solar panel racking structure including purlins, which may be used as a perimeter solar panel racking structure in accordance with examples of this disclosure.
Figure 8:
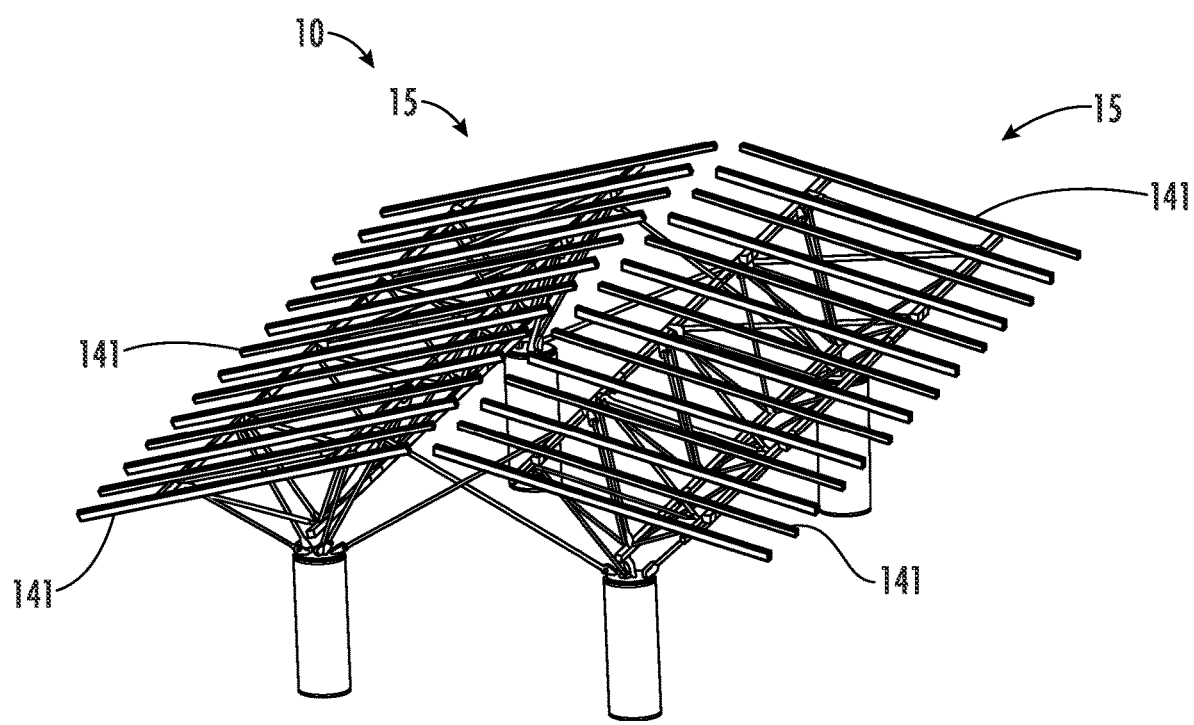
FIG. 8 is a top, side perspective view of a solar panel racking structure including purlins, which may be used as a perimeter solar panel racking structure in accordance with examples of this disclosure.

Referring to FIG. 6, the solar racking unit 15, which may form part of a perimeter solar panel racking structure 10, preferably includes base members 21 forming base assembly 20, lower rail 52, outer upper rail 53, inner upper rail 54, transverse struts 91, diagonal struts 101, and purlins 141. A first ground strut cluster 40a preferably connects the first base member 21a to outer and inner upper chords 53, 54, and a second ground strut cluster 40b preferably connects the second base member 21c to its respective outer and inner upper chords 53, 54. Each ground strut cluster 40 may include four ground struts 41. A first web strut cluster 60a preferably connects the lower chord 52 to its respective outer and inner upper chords 53, 54 at an end of the solar racking unit 15, a second web strut cluster 60b preferably connects the lower chord 52 to its respective outer and inner upper chords 53, 54 at an opposing end of the solar racking unit 15, a third web strut cluster 60c preferably connects the lower chord 52 to its respective outer and inner upper chords 53, 54 between the respective connections with outer and inner upper chords 53, 54 made by first and second web strut clusters 60a, 60b, and a fourth web strut cluster 60d preferably connects the lower chord 52 to its respective outer and inner upper chords 53, 54 between the respective connections with outer and inner upper chords 53, 54 made by second and third web strut clusters 60b, 60c. Each web strut cluster 60a, 60b, 60c, 60d may include four web struts 61.

Referring again to FIG. 4, in exemplary embodiments, each solar racking unit 15 has a length L and a width W forming an aspect ratio of width W:length L. The lengths L of each solar racking unit 15 in perimeter solar panel racking structure 10 may be substantially equivalent, and the widths W of each solar racking unit 15 in perimeter solar panel racking structure 10 may be substantially equivalent. In preferred embodiments, the aspect ratio of each solar racking unit 15 in perimeter solar panel racking structure 10 may be preferably less than 1 (the length L is greater than the width W). In further preferred embodiments, the aspect ratio may be preferably less than 0.9, in further preferred embodiments, less than 0.8, in still further preferred embodiments, less than 0.7, and in still further preferred embodiments, less than 0.5. In preferred embodiments, each solar racking unit 15 in perimeter solar panel racking structure 10 may be preferably oriented so that the length L of each solar racking unit 15 runs parallel to that of its complementary unit 15 when the solar racking units 15 are assembled and coupled to each other via cross-bracing 111 to form perimeter solar panel racking structure 10. In preferred embodiments, the width W and length L are preferably bounded by the surface area of an upper face of a set of solar panels (not shown) on a given solar racking unit 15.

In preferred embodiments, L may be at least 40 feet, in further preferred embodiments, at least 60 feet, in still further preferred embodiments, at least 75 feet, and in yet further preferred embodiments, at least about 80 feet. In preferred embodiments, L may be at most 110 feet, in further preferred embodiments at most 100 feet, in still further preferred embodiments, at most 95 feet, and in still further preferred embodiments, at most about 90 feet.

In preferred embodiments, W may be at least 5 feet, in further preferred embodiments, at least 10 feet, in still further preferred embodiments, at least 12 feet, and in yet further preferred embodiments, at least about 13 feet. In preferred embodiments, W may be at most 27 feet, in further preferred embodiments at most 23 feet, in still further preferred embodiments, at most 21 feet, and in still further preferred embodiments, at most about 15 feet.

Referring to FIG. 3, each solar racking unit 15 has interior dimension B (shown with dashed line labeled "B"), spanning between the centers of base members 21 and cantilever length C (shown with dashed line labeled "C"), spanning from the centers of base members 21 to a nearest outer point of the length dimension L.

In preferred embodiments, the interior dimension B may be preferably at least 30 feet, in further preferred embodiments, at least 35 feet, in still further preferred embodiments, at least 40 feet, in still further preferred embodiments, at least 50 feet, and in still further preferred embodiments, at least 70 feet. In preferred embodiments, the interior dimension B may be preferably at most 90 feet, in further preferred embodiments, at most 85 feet, in still further preferred embodiments, at most 80 feet, and in still further preferred embodiments, at most 75 feet.

In preferred embodiments, the cantilever length C may be preferably at least 7 feet, in further preferred embodiments, at least 10 feet, in further preferred embodiments, at least 13 feet, in still further preferred embodiments, at least 16 feet, and in yet further preferred embodiments, at least 19 feet. In preferred embodiments, the cantilever length C may be preferably at most 30 feet, in further preferred embodiments, at most 25 feet, in still further preferred embodiments, at most 22 feet, and in still further preferred embodiments, at most 20 feet.

In some embodiments, no solar panels are placed directly over one or both cantilevered portions of a solar panel racking unit. In some further embodiments, the cantilever length C may effectively be zero (i.e. the end of the chords rest directly over their respective base member) for one or both sides of a particular solar panel racking unit. In light of this disclosure, a person having ordinary skill in the art will recognize that such features may be particularly useful at the borders of an array field, where wind forces are likely to be strongest.

In various embodiments, the perimeter solar panel racking structures disclosed herein can preferably withstand forces in excess of those associated with category 5 hurricane force winds as measured according to ASCE 49-21 and calculated according to ASCE 7-16. In preferred embodiments, load distribution by the perimeter solar panel racking structures disclosed herein may be preferably such that any perimeter solar panel racking structure can withstand wind speeds of at least 183 mph as measured according to ASCE 49-21 and calculated according to ASCE 7-16. In further embodiments, load distribution by the solar panel racking structures disclosed herein may be preferably such that the solar panel racking structures experience a maximum uplift net gust normal force coefficient ("GCn") magnitude of 4.0 when category 5 hurricane force winds are applied to the structure and as measured according to ASCE 49-21 and calculated according to ASCE 7-16. In further embodiments, load distribution by the solar panel racking structures disclosed herein may be preferably such that the solar panel racking structures experience a maximum uplift GCn magnitude of 3.0 when category 5 hurricane force winds are applied to the structure and as measured according to ASCE 49-21 and calculated according to ASCE 7-16; in further embodiments, 2.5; in further embodiments, 2.25; in further embodiments, 2.0; in further embodiments, 1.5; and in still further embodiments, 1.0.

In various embodiments, the upper panel mount assembly 30 with attached cross-braces 111 or a portion thereof can preferably withstand the forces applied by crane or other lifting, in addition to, when the panel mount assembly 30 with cross-braces 111 or a portion thereof may be incorporated into the solar racking units 15 of a perimeter solar panel racking structure 10, forces applied by strong winds, including winds consistent with or in excess of category 5 hurricane winds.

In various embodiments, the perimeter solar panel racking structures disclosed herein may be used in ground-mount solar panel racking applications. In such embodiments, the base assembly may be preferably appropriately sized to achieve proper height.

In various embodiments, the perimeter solar panel racking structures disclosed herein may be used in canopy solar panel racking applications. In such embodiments, the base assembly may be preferably appropriately sized to achieve proper height.

In various embodiments, the perimeter solar panel racking structures disclosed herein may be used in roof-mount solar panel racking applications. In such embodiments, the base assembly may be preferably appropriately sized to achieve proper height off of a supporting roof, and base members of the base assembly are preferably properly selected for attachment to the roof.

Core Solar Panel Racking Structures

Generally, core solar panel racking structures are selected pursuant to the present disclosure to preferably provide improved solar collection, cost, or other efficiency over more robust units that would conventionally be used throughout solar array fields in potentially high wind force environments.

In various embodiments, core solar panel racking structures may be made up of conventional triangular truss frames having less resilience, but requiring less material or being less complex and thus less expensive to construct relative to perimeter solar panel racking structures. Core solar panel racking structures may also be solar tracker-type devices, which have less resilience to wind forces but provide greater solar collection efficiency than perimeter solar panel racking structures. A person having ordinary skill in the art will recognize in light of this disclosure that additional types of core solar panel racking structures may be devised based on the principles disclosed herein. A mixture of the above types of core solar panel racking structures may also be used.

In some embodiments, all or a portion of the core solar panel racking structures may have the same (or similar) structure as the perimeter solar panel racking structures.

System For Providing Solar Array Field

The disclosure of the present invention provides a system for providing a solar array field having improved solar collection efficiency. The system may include perimeter solar panel racking structures forming at least a portion of a perimeter of a solar array field and core solar panel racking structures forming a remainder of the solar array field. The perimeter solar panel racking structures may be rigid and have a shielding effect such that core solar panel racking structures experience reduced wind forces relative to wind forces applied to the entire solar array field. The system may include any perimeter solar panel racking structures set forth herein. Further, the system may include any core solar panel racking structures set forth herein.

Method For Assembly Solar Array Field

The disclosure of the present invention provides a method for assembling a solar array field in accordance with any of the solar array field embodiments described herein. For example, the method for assembling a solar array field may include the steps of A) providing perimeter solar panel racking structures, wherein perimeter solar panel racking structures are preferably rigid; (B) providing core solar panel racking structures, wherein the core solar panel racking structures may be less wind tolerant than the perimeter solar panel racking structures; and (C) securing the perimeter solar panel racking structures around a significant portion of a perimeter formed by the core solar panel racking structures to form a solar array field (see, for example, FIG. 1). The core solar panel racking structures preferably experience reduced wind forces relative to wind forces applied to the entire solar array field. The method may include any perimeter solar panel racking structures set forth herein. Further, the method may include any core solar panel racking structures set forth herein.

The disclosure will now be illustrated with reference to the following non-limiting examples.

EXAMPLES

Wind Tunnel Testing Example 1

Figure 13:
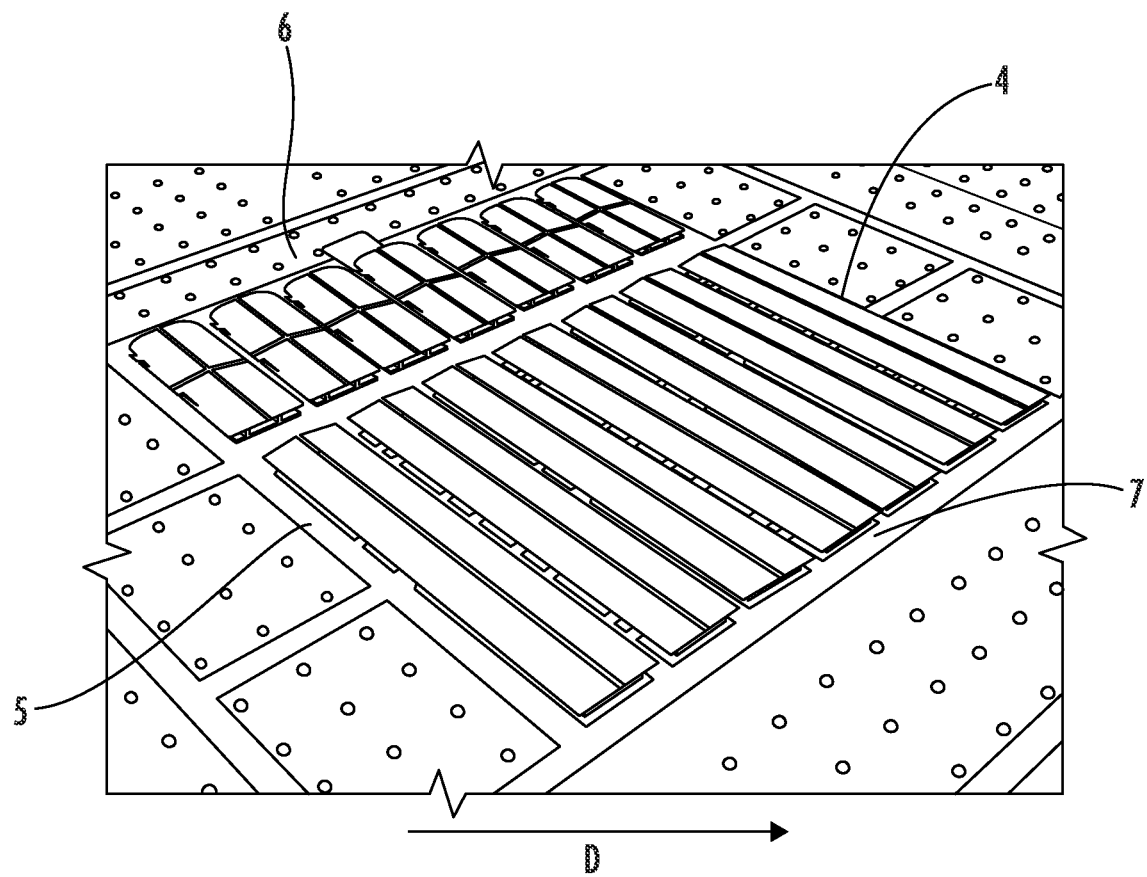
FIG. 13 is a photographic top, side perspective view of an exemplary solar array field scaled down for wind tunnel testing.

Three small-scale model solar array fields were constructed according to the configuration shown in FIG. 13 and subjected to wind tunnel testing in an atmospheric boundary layer wind tunnel according to ASCE 49-21. Individual solar panel racking structures within each solar array field had the configuration identified in FIG. 5 with model solar panels resting on each solar racking unit (FIG. 5 not to scale). Each model solar array field was assembled such that when scaled up by a factor of 72, it had the dimensions identified in TABLE 1, below. Actual measurements of the individual model solar panel racking structures are 1/72 of the measurements provided in TABLE 1. Base members were columnar and cylindrical in shape. All model components were constructed by stereolithography ("SLA") resin 3D printing. Each array field was tested separately according to the same procedure. Field A was constructed of solar panel racking structures having tilt angles, θa and θb, of 7 degrees. Field B was constructed of solar panel racking structures having tilt angles, θa and θb, of 15 degrees. Field C was constructed of solar panel racking structures having tilt angles, θa and θb, of 25 degrees. In testing, an initial wind approach azimuth traveled from left to right across the configuration identified in FIG. 13 (following direction D). Each Field was tested at a variety of wind approach azimuths, beginning at a zero-degree wind approach (the above identified initial wind approach azimuth following direction D) and rotating through 10 degree increments to a 180-degree wind approach. FIG. 13 further shows north 6, south 7, east 4, and west 5 borders.

TABLE 1

| Dimension | Value |
| --- | --- |
| Solar Panel Racking Structure (Perimeter and Core) Dimensions | |
| Length, L | 536 in. |
| Width, W | 173 in. |
| Gap, G | 24 in. |
| Tilt Angles, θa and θb | 7 (Field A), 15 (Field B), 25 (Field C) degrees |
| Cantilever Length, C | 88 in. |
| Interior Dimension, B | 360 in. |
| Aspect Ratio (W:L) | 0.32 |
| Base Member Height | 57 in. |
| Array Field Dimensions | |
| Side gaps | 10 in. |
| Row gaps | 84 in. |
| Drive aisle width | 250 in. |

Figure 14:
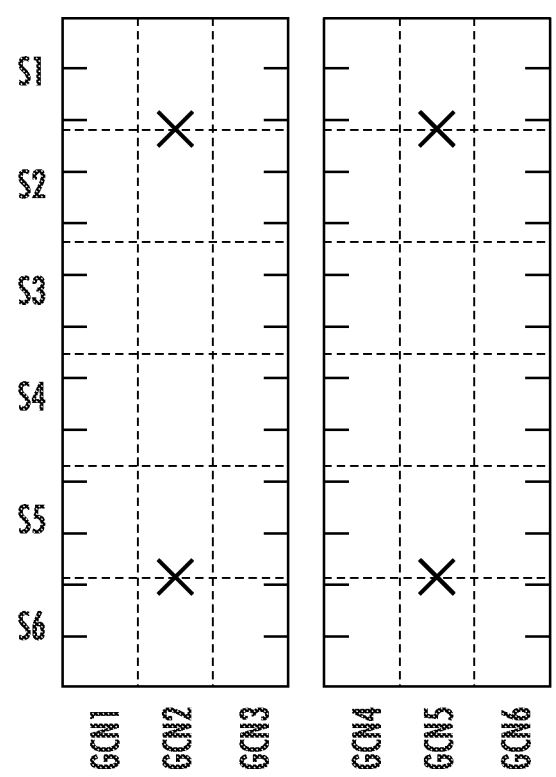
FIG. 14 is a top-down, diagrammatic view of an exemplary perimeter solar panel racking structure with region identifiers.

The uplift net gust normal force coefficient ("GCn") was calculated for various locations on the structures of the model solar array field for each wind approach azimuth and in different regions of the array fields based on pressure readings taken using standard pressure transducer sensors located at designated points along each solar panel racking structure. FIG. 14 shows a schematic, top-down view of an individual solar panel racking structure. For each model solar panel racking structure tested, pressure transducers were located on the solar panel racking structures in each of the labeled rectangles identified in FIG. 14, with an individual rectangle corresponding to the intersection of a row GCN1 to GCN6 and a column 1 to 6. "X" marks indicate the location of base members. GCn is calculated from pressure readings using the calculation methods specified in ASCE 7-16.

An outer maximum average uplift GCn is calculated for the outer perimeter row of perimeter solar panel racking structures. To calculate this number, the magnitudes of the calculated uplift GCn's for a particular location (specified by a row, GCN1 to GCN6, and column, 1 to 6, designation) for all outer perimeter solar panel racking structures are added together and divided by the total number of outer perimeter solar panel racking structures. The highest such average value is selected as the maximum average uplift GCn for a given Field A, B, or C. An inner maximum average uplift GCn is calculated for the remaining solar panel racking structures. To calculate this number, the magnitudes of the calculated uplift GCn's for a particular location (specified by a row, GCN1 to GCN6, and column, 1 to 6, designation) for all remaining solar panel racking structures are added together and divided by the total number of outer perimeter solar panel racking structures. The highest such average value is selected as the maximum average uplift GCn for a given Field A, B, or C. The outer maximum average uplift GCn is divided by the inner maximum average uplift GCn to quantify the relative force on the core solar panel racking structures. For each of Fields A, B, and C, the core solar panel racking structures experienced equal to or less than 68% of the maximum average uplift GCn relative to the outer perimeter solar panel racking structures.

The particular solar array fields as herein disclosed, illustrated, and described are to be understood as only embodiments of the present invention and thus representative of the subject matter which is broadly contemplated by the present invention. The scope of the present invention fully encompasses other embodiments that may be or may become obvious to those skilled in the art, and the scope of the present invention is accordingly to be limited by nothing other than the appended claims. In the appended claims, reference to an element in the singular is not intended to mean "one and only one" unless explicitly so stated, but rather "one or more". All structural and functional equivalents to the elements of the above-described embodiment that are known or later come to be known to those of ordinary skill in the art are expressly incorporated herein by reference and are intended to be encompassed by the present claims. Moreover, it is not necessary for a device to address each and every problem sought to be solved by the present invention for it to be encompassed by the present claims. Furthermore, no element, component, or combination in the present disclosure is intended to be dedicated to the public regardless of whether the element, component, or method step is explicitly recited in the claims. No claim element herein is to be construed under the provisions of 35 U.S.C. § 112, sixth paragraph, unless the element is expressly recited using the phrase "means for." Absent express definitions herein, all claim terms are to be given all ordinary and accustomed meanings that are not irreconcilable with the present specification and the file history.

Further, the purpose of the Abstract is to enable the various patent offices and the public generally, and especially the scientists, engineers, and practitioners in the art who are not familiar with patent or legal terms or phraseology, to determine quickly from a cursory inspection the nature and essence of the technical disclosure of the application. The Abstract is not intended to be limiting as to the scope of the invention in any way.

What is claimed is:

1. A solar array field comprising:
perimeter solar panel racking structures forming at least a portion of a perimeter of the solar array field, wherein each perimeter solar panel racking structure comprises a first solar panel racking unit supporting a first set of solar panels and a second solar panel racking unit supporting a second set of solar panels, and wherein each of the first and second sets of solar panels slope in an upward direction toward a midline formed between the two sets of solar panels to form a tent-like structure; and
core solar panel racking structures,
wherein the perimeter solar panel racking structures are rigid and have a shielding effect such that core solar panel racking structures experience reduced wind forces relative to wind forces applied to the perimeter solar panel racking structures.

2. The solar array field of claim 1, wherein at least a portion of the perimeter is formed by a plurality of the perimeter solar panel racking structures that are arranged at least two rows deep into the array field.

3. The solar array field of claim 1, wherein the solar array field further comprises row gaps between the perimeter solar panel racking structures, and wherein the row gaps are between about 10 inches and about 90 inches in length.

4. The solar array field of claim 1, wherein the first set of solar panels form a plane having a magnitude of a tilt angle, θa, formed between the first set of solar panels and an installation ground surface and the second set of solar panels form a plane having a magnitude of a tilt angle, θb, formed between the second set of solar panels and an installation ground surface, wherein the tilt angle, θa, and the tilt angle, θb, are between 7 and 28 degrees.

5. The solar array field of claim 1, wherein the solar array field comprises between about 10-50% perimeter solar panel racking structures as a percentage of the total number of solar panel racking structures in the solar array field.

6. The solar array field of claim 1, wherein at least about 30% of all perimeter solar panel racking structures in the array field are located on perimeter of the solar array field.

7. The solar array field of claim 1, wherein the solar array field further comprises side gaps between adjacent perimeter solar panel racking structures, wherein the side gaps are between about 0.5 inches and about 10 inches in length, wherein the solar array field further comprises drive aisles, and wherein the drive aisles are no more than 20 feet in width.

8. The solar array field of claim 1, wherein the core solar panel racking structures are selected from the group consisting of solar tracker racking structures, triangular truss solar racking structures, and mixtures thereof.

9. The solar array field of claim 1, wherein the core solar panel racking structures experience an average normal force coefficient GCn for uplift that is about 68% of the average normal force coefficient for uplift experienced by perimeter solar panel racking structures or less, as measured according to ASCE 49-21 and calculated according to ASCE 7-16 under category-5 hurricane force wind conditions.

10. The solar array field of claim 1, wherein the core solar panel racking structures experience effective wind speeds of about 125 mph or less when the solar array field as a whole is exposed to category-5 hurricane force wind conditions, as measured according to ASCE 49-21 and calculated according to ASCE 7-16.

11. The solar array field of claim 1, wherein the first and second solar panel racking units each have a base assembly and an upper panel mount assembly;
wherein the first set of solar panels are secured to the upper panel mount assembly of the first solar racking unit and the second set of solar panels are secured to the upper panel mount assembly of the second solar racking unit;
wherein each perimeter solar panel racking structure further comprises at least first and second cross-braces, wherein the first cross-brace attaches the base assembly of the first solar racking unit to the upper panel mount assembly of the second solar racking unit and the second cross-brace attaches the base assembly of the second solar racking unit to the upper panel mount assembly of the first solar racking unit.

12. The solar array field of claim 11, wherein each perimeter solar panel racking structure further comprises a gap between an uppermost edge of the first set of solar panels and an uppermost edge of the second set of solar panels, and wherein the gap is between about 8 and about 40 inches wide.

13. The solar array field of claim 11, wherein each solar racking unit defines a width dimension, W, and a length dimension, L, with each dimension bounded by the surface area of an upper face of each set of solar panels, thus defining an aspect ratio for each solar racking unit, W: L, and wherein the aspect ratio of each solar racking unit is less than 0.7.

14. The solar array field of claim 13, wherein W for each solar racking unit is between about 10 feet and about 27 feet and L for each solar racking unit is between about 44 feet and about 110 feet.

15. The solar array field of claim 1, wherein the perimeter solar panel racking structures are more wind tolerant than the core solar panel racking structures.

16. The solar array field of claim 1, wherein the solar array field further comprises row gaps and side gaps between adjacent perimeter solar panel racking structures, wherein the row gaps are between about 10 inches and about 90 inches in length, and wherein the side gaps are between about 0.5 inches and about 10 inches in length.

17. A solar array field comprising:
perimeter solar panel racking structures forming at least a portion of a perimeter of the solar array field; and
core solar panel racking structures,
wherein the perimeter solar panel racking structures are rigid and have a shielding effect such that core solar panel racking structures experience reduced wind forces relative to wind forces applied to the perimeter solar panel racking structures;
wherein each perimeter solar panel racking structure comprises:
a first solar racking unit comprising:
a base assembly comprising at least first and second base members;
an upper panel mount assembly comprising:
an outer upper chord and an inner upper chord;

a lower chord;
at least first and second web strut clusters;
at least first and second ground strut clusters; and
at least first and second transverse struts, wherein each of the first and second transverse struts of the first solar racking unit connects the outer upper chord of the first solar racking unit to the inner upper chord of the first solar racking unit,
a second solar racking unit comprising:
a base assembly comprising at least first and second base members;
an upper panel mount assembly comprising:
an outer upper chord and an inner upper chord;
a lower chord;
at least first and second web strut clusters;
at least first and second ground strut clusters; and
at least first and second transverse struts, wherein each of the first and second transverse struts of the second solar racking unit connects the outer upper chord of the second solar racking unit to the inner upper chord of the second solar racking unit, and
at least first and second cross-braces;
wherein the first cross-brace attaches the first base member of the first solar racking unit to the inner upper chord of the second solar racking unit and the second cross-brace attaches the first base member of the second solar racking unit to the inner upper chord of the first solar racking unit;
wherein each web strut cluster of each solar racking unit attaches the lower chord to the inner and outer upper chords of each, respective solar racking unit; and
wherein the first ground strut cluster of each solar racking unit attaches the first base member to the inner and outer upper chords of each, respective solar racking unit and the second ground strut cluster of each solar racking unit attaches the second base member to the inner and outer upper chords of each, respective solar racking unit.

18. The solar array field of claim 17, wherein the first solar racking unit supports a first set of solar panels attached to the upper panel mount assembly of the first solar racking unit and the second solar racking unit supports a second set of solar panels attached to the upper panel mount assembly of the second solar racking unit.

19. The solar array field of claim 18, wherein each solar racking unit further comprises third and fourth web strut clusters.

20. The solar array field of claim 18, wherein the first set of solar panels and second set of solar panels are supported by their respective solar racking units such that each set of solar panels slopes upward toward a midpoint line between the solar racking units, and each perimeter solar panel racking structure forms a tent-like structure, and wherein the first set of solar panels form a plane having a magnitude of a tilt angle, θa, formed between the first set of solar panels and an installation ground surface and the second set of solar panels form a plane having a magnitude of a tilt angle, θb, formed between the second set of solar panels and an installation ground surface, wherein the tilt angle, θa, and the tilt angle, θb, are between 7 and 28 degrees.

21. A method for assembling a solar array field, the method including the steps of:
A) providing perimeter solar panel racking structures, wherein each perimeter solar panel racking structure comprises a first solar panel racking unit supporting a first set of solar panels and a second solar panel racking unit supporting a second set of solar panels, and wherein each the first and second sets of solar panels slope in an upward direction toward a midline formed between the two sets of solar panels to form a tent-like structure, wherein the perimeter solar panel racking structures are rigid;
(B) providing core solar panel racking structures, wherein the core solar panel racking structures are less wind tolerant than the perimeter solar panel racking structures; and
(C) securing the perimeter solar panel racking structures around a significant portion of a perimeter formed by the core solar panel racking structures to form a solar array field, wherein the perimeter solar panel racking structures have a shielding effect such that the core solar panel racking structures experience reduced wind forces relative to wind forces applied to the entire solar array field.

22. The system of claim 21, wherein the core solar panel racking structures are selected from the group consisting of solar tracker racking structures, triangular truss solar racking structures, and mixtures thereof.

23. The method of claim 21, wherein the first and second solar racking units each have a base assembly and an upper panel mount assembly;
wherein the first set of solar panels are secured to the upper panel mount assembly of the first solar racking unit and the second set of solar panels are secured to the upper panel mount assembly of the second solar racking unit;
wherein each perimeter solar panel racking structure further comprises at least first and second cross-braces, wherein the first cross-brace attaches the base assembly of the first solar racking unit to the upper panel mount assembly of the second solar racking unit and the second cross-brace attaches the base assembly of the second solar racking unit to the upper panel mount assembly of the first solar racking unit.

* * * * *